US012424166B2

(12) United States Patent
Gao et al.

(10) Patent No.: US 12,424,166 B2
(45) Date of Patent: Sep. 23, 2025

(54) DISPLAY PANEL AND DISPLAY DEVICE

(71) Applicants: Wuhan Tianma Micro-Electronics Co., Ltd., Wuhan (CN); Wuhan Tianma Micro-Electronics Co., Ltd. Shanghai Branch, Shanghai (CN)

(72) Inventors: Yana Gao, Wuhan (CN); Gaojun Huang, Wuhan (CN); Xingyao Zhou, Wuhan (CN)

(73) Assignees: Wuhan Tianma Micro-Electronics Co., Ltd., Wuhan (CN); Wuhan Tianma Micro-Electronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/639,525

(22) Filed: Apr. 18, 2024

(65) Prior Publication Data

US 2025/0046246 A1 Feb. 6, 2025

(30) Foreign Application Priority Data

Jul. 31, 2023 (CN) ......................... 202310962955.4

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/0247* (2013.01); *G09G 2320/0257* (2013.01); *G09G 2330/021* (2013.01); *G09G 2330/026* (2013.01); *G09G 2330/027* (2013.01)

(58) Field of Classification Search
None
See application file for complete search history.

(56) References Cited

U.S. PATENT DOCUMENTS

| | | | | |
|---|---|---|---|---|
| 8,031,135 | B2 * | 10/2011 | Chung | G09G 3/2946 345/63 |
| 9,940,872 | B2 * | 4/2018 | An | G09G 3/3208 |
| 2004/0174349 | A1 * | 9/2004 | Libsch | H10D 86/00 257/E27.111 |
| 2010/0315405 | A1 * | 12/2010 | Tanaka | G09G 3/3648 345/212 |
| 2014/0168184 | A1 * | 6/2014 | Kim | G09G 3/3233 345/79 |

* cited by examiner

*Primary Examiner* — Dorothy Harris
(74) *Attorney, Agent, or Firm* — Anova Law Group, PLLC

(57) ABSTRACT

A display panel includes a light-emitting element, a pixel circuit, and a peripheral drive circuit. The pixel circuit includes a drive module, a first reset module, and a compensation module. The operation process includes a power-on stage and a display stage in sequence. The power-on stage includes a first phase and a second phase in sequence. For part of the frames of the power-on stage, the peripheral drive circuit provides a first control signal to a control terminal of the first reset module. The first reset module is turned on. The peripheral drive circuit provides a second control signal to a control terminal of the compensation module. The compensation module is turned on. In the second phase, the peripheral drive circuit provides a first power supply voltage to a first terminal and/or provides a second power supply voltage to a second terminal. Problems of power-on flickering are improved.

20 Claims, 17 Drawing Sheets

DISPLAY PANEL AND DISPLAY DEVICE

CROSS-REFERENCE TO RELATED APPLICATION

This application claims the priority of Chinese Patent Application No. 202310962955.4, filed on Jul. 31, 2023, the content of which is incorporated herein by reference in its entirety.

TECHNICAL FIELD

The present disclosure generally relates to the field of display technology and, more particularly, relates to display panels and display devices.

BACKGROUND

With characteristics of self-illumination, fast response, wide color gamut, large viewing angle, and high brightness, organic light-emitting diodes (OLEDs) are widely used to make thin display devices and flexible display devices and have become a focus of research in the field of display technology. OLEDs require current drive. For example in the display field, a drive transistor in a pixel circuit provides a drive current to an OLED to make it emit light. It is needed to provide a stable drive current to the OLED to ensure the display performance in applications. In existing technologies, the signal that drives the pixel circuit is provided through a peripheral circuit. At the moment of display after power on, some OLEDs flicker and cause display issues. Thus, it is desirable for display panels and display devices that prevent power-on flickering of OLEDs.

The disclosed structures and methods are directed to at least partially alleviate one or more problems set forth above and to solve other problems in the art.

SUMMARY

One aspect of the present disclosure provides a display panel that includes a light-emitting element, a pixel circuit, and a peripheral drive circuit. The pixel circuit at least includes a drive module, a first reset module, and a compensation module. The drive module and the light-emitting element are connected in series between a first power supply voltage signal terminal and a second power supply voltage signal terminal. The drive module is used to generate a drive current to drive the light-emitting element to emit light. The first reset module is electrically connected to a control terminal of the drive module and used to initialize the control terminal of the drive module. The compensation module is connected in series between the control terminal of the drive module and a second terminal of the drive module to compensate a voltage of the control terminal of the drive module. The peripheral drive circuit provides a drive signal to the pixel circuit. An operation process of the display panel at least includes a power-on stage and a display stage in sequence. The power-on stage at least includes a first phase and a second phase in sequence. The power-on stage includes frames that are consecutive. During a period of at least part of frames of the power-on stage, the peripheral drive circuit provides a first control signal to a control terminal of the first reset module and the first reset module is turned. The peripheral drive circuit provides a second control signal to a control terminal of the compensation module and the compensation module is turned on. In the second phase, the peripheral drive circuit provides a first power supply voltage to the first power supply voltage signal terminal and/or provides a second power supply voltage to the second power supply voltage signal terminal.

Another aspect of the present disclosure provides a display device that contains a display panel. The display panel includes a light-emitting element, a pixel circuit, and a peripheral drive circuit. The pixel circuit at least includes a drive module, a first reset module, and a compensation module. The drive module and the light-emitting element are connected in series between a first power supply voltage signal terminal and a second power supply voltage signal terminal. The drive module is used to generate a drive current to drive the light-emitting element to emit light. The first reset module is electrically connected to a control terminal of the drive module and used to initialize the control terminal of the drive module. The compensation module is connected in series between the control terminal of the drive module and a second terminal of the drive module to compensate a voltage of the control terminal of the drive module. The peripheral drive circuit provides a drive signal to the pixel circuit. An operation process of the display panel at least includes a power-on stage and a display stage in sequence. The power-on stage at least includes a first phase and a second phase in sequence. The power-on stage includes frames that are consecutive. During a period of at least part of frames of the power-on stage, the peripheral drive circuit provides a first control signal to a control terminal of the first reset module and the first reset module is turned. The peripheral drive circuit provides a second control signal to a control terminal of the compensation module and the compensation module is turned on. In the second phase, the peripheral drive circuit provides a first power supply voltage to the first power supply voltage signal terminal and/or provides a second power supply voltage to the second power supply voltage signal terminal.

Other aspects or embodiments of the present disclosure can be understood by those skilled in the art in light of the description, the claims, and the drawings of the present disclosure.

BRIEF DESCRIPTION OF THE DRAWINGS

The accompanying drawings, which are incorporated in and constitute a part of the specification, illustrate embodiments of the present disclosure and, together with the description, serve to explain the principles of the present disclosure. The drawings are merely examples for illustrative purposes according to various disclosed embodiments and are not intended to limit the scope of the present disclosure.

DETAILED DESCRIPTION

Figure 1:
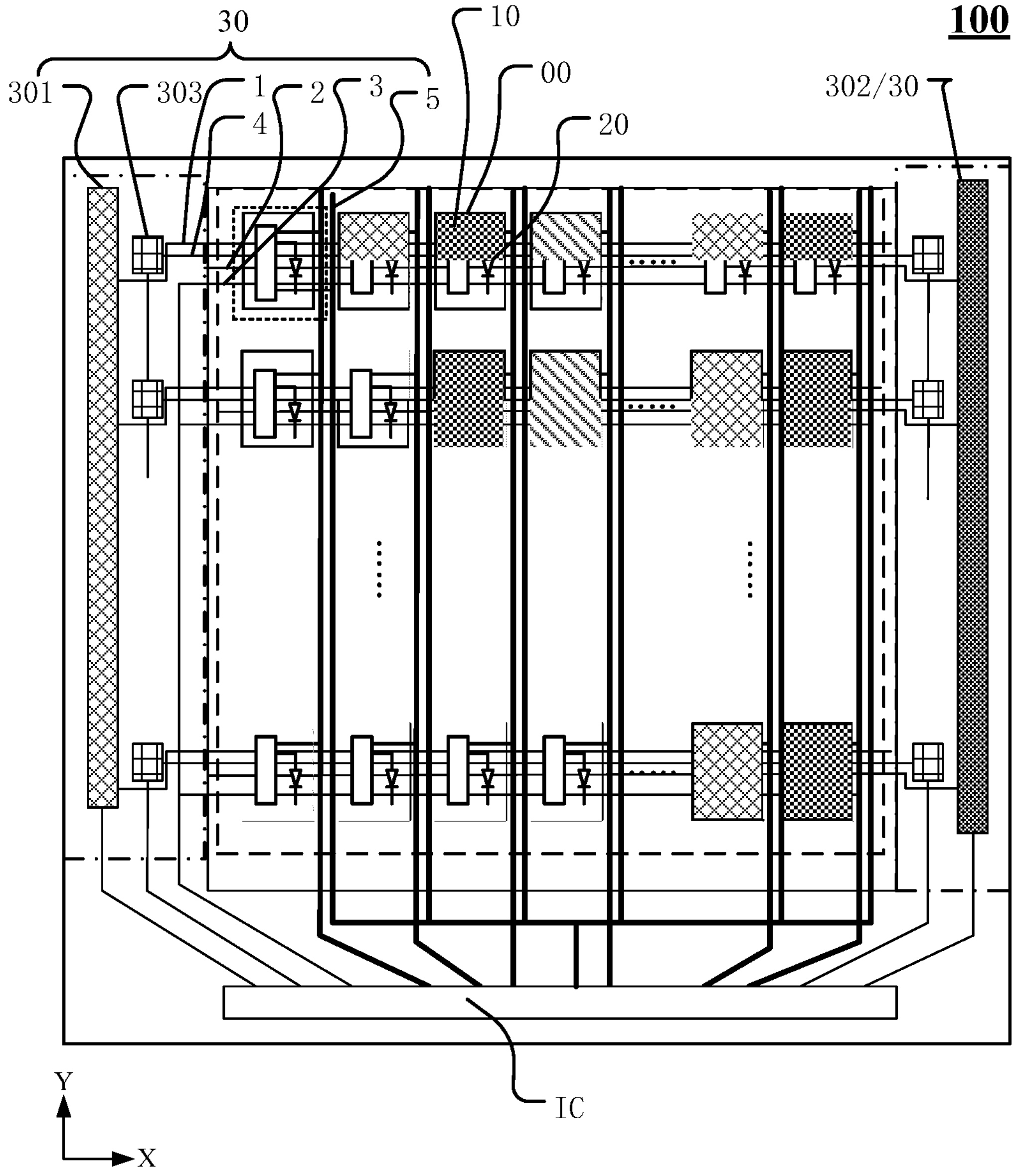
FIG. 1 shows a schematic diagram of a planar structure of a display panel according to various disclosed embodiments of the present disclosure.

Reference will now be made in detail to exemplary embodiments of the disclosure, which are illustrated in the accompanying drawings. Unless otherwise specifically stated, the relative arrangement of components and steps, numerical expressions, and numerical values set forth in these embodiments do not limit the scope of the invention.

The following description for at least one exemplary embodiment is merely illustrative in nature and is in no way intended to limit the invention, its application, or uses.

Techniques, methods, and devices known to those of ordinary skill in the relevant art may not be discussed in detail, but where appropriate, such techniques, methods, and devices should be considered a part of the specification.

In all examples shown and discussed herein, any specific values are to be construed as illustrative only and not as limiting. Accordingly, other examples of the exemplary embodiments may have different values.

It should be noted that similar reference numerals and letters indicate similar items in the following figures. Therefore, once an item is defined in one figure, it does not require further discussion in the following figures.

The present disclosure provides a display panel and a display device to improve power-on flicker of light-emitting elements and reduce power consumption of display panels.

A first aspect of the present disclosure provides a display panel. The display panel includes a light-emitting element, a pixel circuit, and a peripheral drive circuit. The pixel circuit at least includes a drive module, a first reset module, and a compensation module. The drive module and light-emitting element are connected in series between first and second power supply voltage signal terminals. The drive module is used to generate a drive current to drive the light-emitting element to emit light. The first reset module is electrically connected to a control terminal of the drive module, and is used to initialize the control terminal of the drive module. The compensation module is connected in series between the control terminal of the drive module and an output terminal of the drive module, compensating the voltage of the control terminal of the drive module. The peripheral drive circuit provides circuit signals to the pixel circuit.

The operation process of the display panel at least includes a power-on stage and a display stage sequentially. The power-on stage at least includes a first phase and a second phase sequentially. The power-on stage contains multiple consecutive frames. For at least part of a frame at the power-on stage, the peripheral drive circuit provides a first control signal to a control terminal of the first reset module, and the first reset module is turned on. The peripheral drive circuit provides a second control signal to a control terminal of the compensation module, and the compensation module is turned on. In the second phase, the peripheral drive circuit provides a first power supply voltage to the first power supply voltage signal terminal and/or provides a second power supply voltage to the second power supply voltage signal terminal.

A second aspect of the present disclosure provides a display device that includes the display panel illustrated above in the first aspect. Compared with existing technologies, the display panel and display device provided by the present disclosure at least achieve the following beneficial effects:

The display panel includes a pixel circuit and a light-emitting element that are electrically connected. The pixel circuit is used to control light emission of the light-emitting element. The pixel circuit at least includes a drive module, a first reset module, and a compensation module. The drive module and the light-emitting element are connected in series between first and the second power supply voltage signal terminals. The drive module is used to generate a drive current to drive the light-emitting element to emit light. The first reset module is electrically connected to a control terminal of the drive module and used to initialize the control terminal of the drive module. The compensation module is connected in series between the control terminal of the drive module and an output terminal of the drive module to compensate the voltage of the control terminal of the drive module. The compensation module is used to detect and compensate for the deviation of the threshold voltage of the drive module, and provide a compensated threshold voltage deviation to the drive module to achieve threshold compensation for the drive module. The drive module and light-emitting element are connected in series between the first and second power supply voltage signal terminals. When the pixel circuit drives the light-emitting element electrically connected to it to emit light, the conductive path used is through the first power supply voltage signal terminal, the drive module, the light-emitting element, and the second power supply voltage signal terminal. The drive module generates a drive current that drives the light-emitting element and makes the light-emitting element to emit light. A peripheral drive circuit of the present disclosure provides circuit signals to the pixel circuit. Since a first terminal of the drive module is connected to a first power supply voltage of the first power supply voltage signal terminal when last images are displayed, positive charges accumulate at the first terminal of the drive module. These charges are stored in parasitic capacitors. When the first control signal controls the first reset module to turn on and the second control signal controls the compensation module to turn on, since the Vgs of the drive module is smaller than Vth, the drive module turns on. At the same time, the remaining charges are released until the drive module is turned off. Subsequently, at the beginning of the display stage, since the residual charges have been released at the power-on stage, the light-emitting element does not flicker.

Any product implementing the present disclosure does not necessarily need to achieve all the above-mentioned technical effects at the same time.

Other features of the present disclosure and its advantages will become apparent from the following detailed description of exemplary embodiments of the present disclosure with reference to the accompanying drawings.

Figure 2:
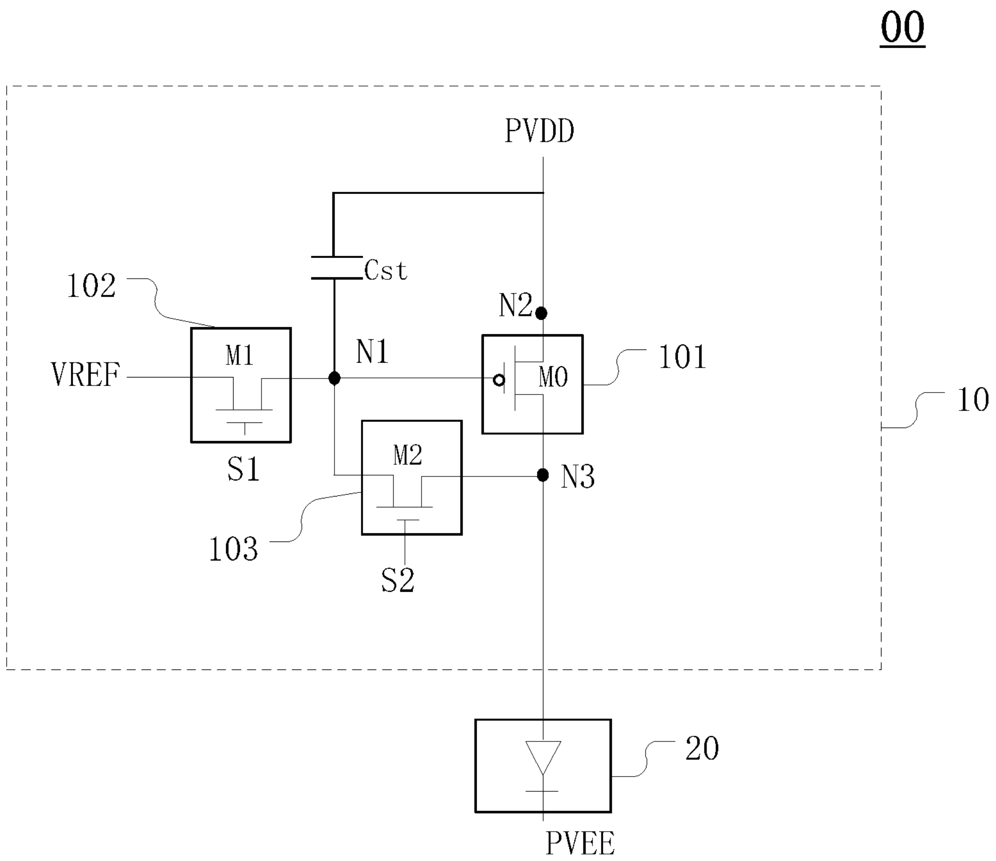
FIG. 2 shows a schematic diagram of a circuit connection structure of a sub-pixel in FIG. 1 according to various disclosed embodiments of the present disclosure.
Figure 4:
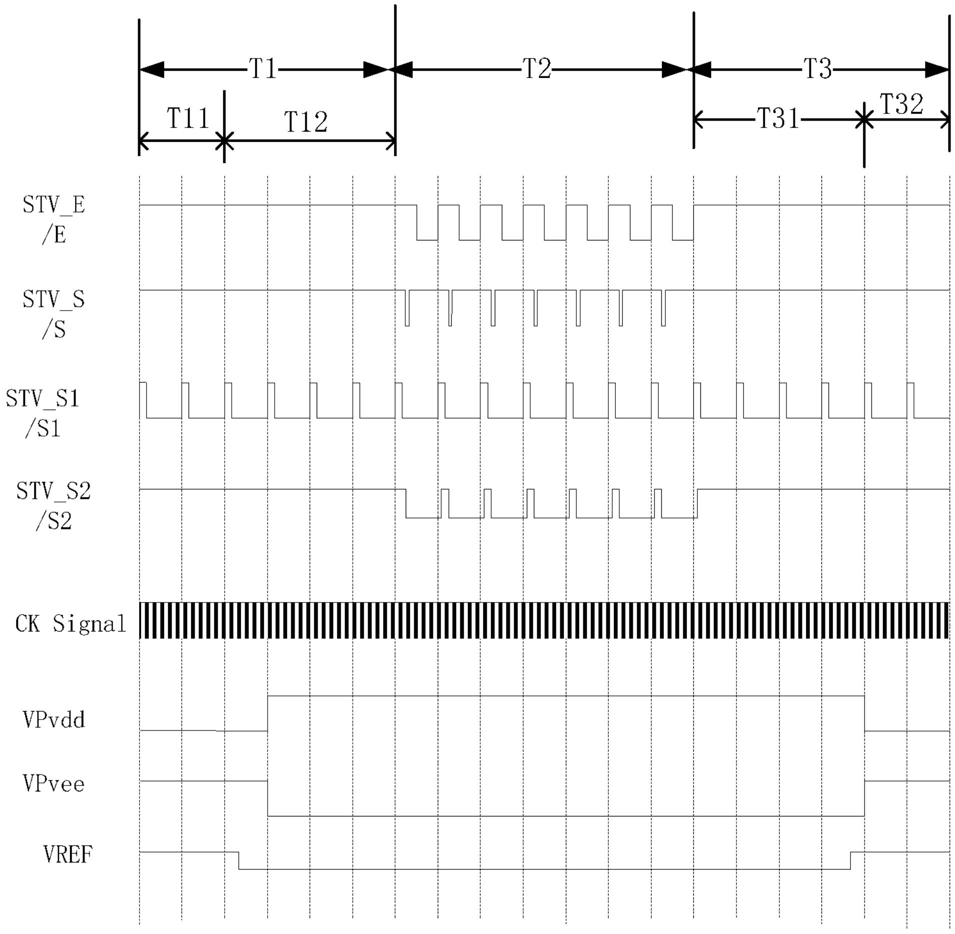
FIG. 4 shows a work timing diagram of a pixel circuit in FIG. 2 according to various disclosed embodiments of the present disclosure.
Figure 5:
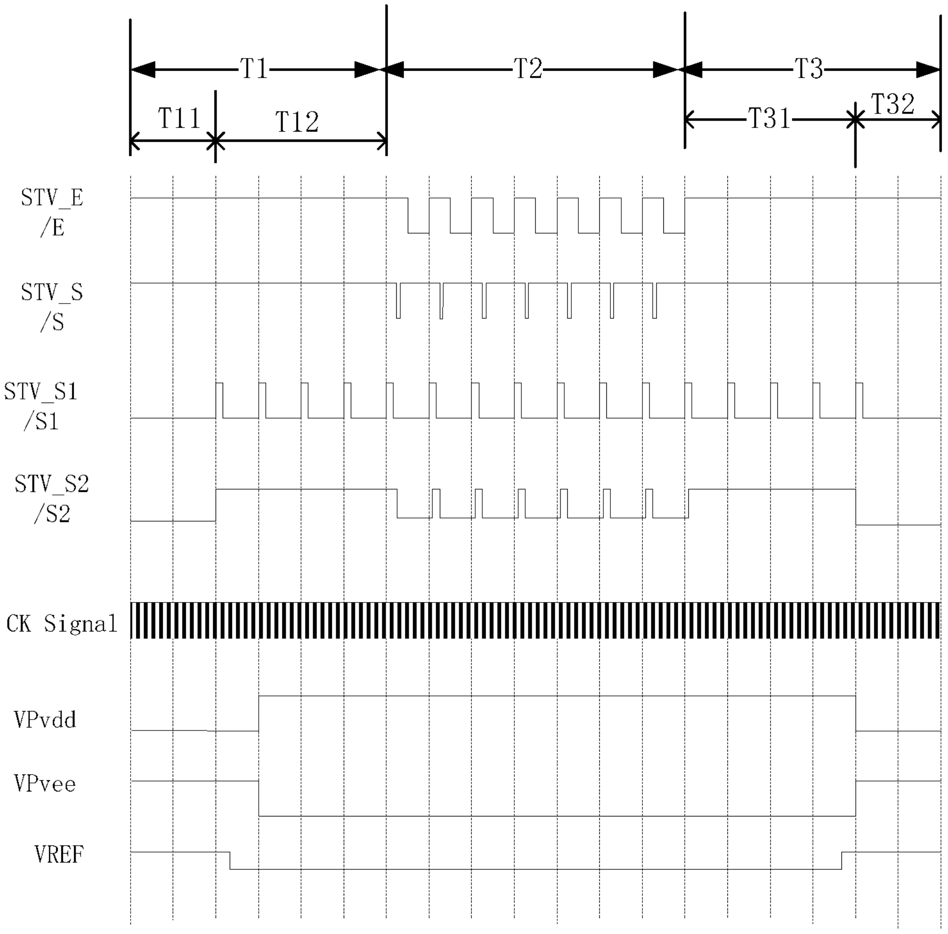
FIG. 5 shows another work timing diagram of a pixel circuit in FIG. 2 according to various disclosed embodiments of the present disclosure.

FIG. 1 illustrates a schematic diagram of a planar structure of a display panel 100 according to the present disclosure. FIG. 2 illustrates a schematic diagram of a circuit connection structure of a sub-pixel in FIG. 1 according to the present disclosure. FIG. 4 illustrates a work timing diagram of a pixel circuit in FIG. 2 according to the present disclosure. FIG. 5 illustrates another work timing diagram of the pixel circuit in FIG. 2 according to the present disclosure. The display panel 100 includes a light-emitting element 20, a pixel circuit 10, and a peripheral drive circuit 30. The pixel circuit 10 at least includes a drive module 101, a first reset module 102, and a compensation module 103. The drive module 101 and light-emitting element 20 are connected in series between first and second power supply voltage signal terminals PVDD and PVEE. The drive module 101 is used to generate a drive current to drive the light-emitting element 20 to emit light. The first reset module 102 is electrically connected to a control terminal of the drive module 101 and used to initialize the control terminal of the drive module 101. The compensation module 103 is connected in series between the control terminal of the drive module 101 and a second terminal of the drive module 101 to compensate the voltage of the control terminal of the drive module 101. The peripheral drive circuit 30 provides drive signals to the pixel circuit 10.

The operation process of the display panel 100 at least includes a power-on stage T1 and a display stage T2 in sequence. The power-on stage T1 at least includes a first phase T11 and a second phase T12 in sequence. The power-on stage T1 contains consecutive frames. For at least some frames of the power-on stage T1, the peripheral drive circuit 30 provides a first control signal S1 to a control terminal of the first reset module 102. The first reset module 102 turns on. The peripheral drive circuit 30 provides a second control signal S2 to a control terminal of the compensation module 103. The compensation module 103 turns on. In the second phase T12, the peripheral drive circuit 30 provides a first power supply voltage VPvdd to the first power supply voltage signal terminal PVDD and/or provides a second power supply voltage VPvee to the second power supply voltage signal terminal PVEE. In FIG. 4, STV_S1 is a trigger signal of the first control signal S1, and STV_S2 is a trigger signal of the second control signal S2.

In some cases, the display panel 100 is an organic light-emitting display panel. In some other cases, the display panel 100 is a display panel that controls the drive module 101 in the pixel circuit 10 to provide a drive current for the light-emitting element 20 to emit light. In some cases, the light-emitting element 20 is an OLED. Alternatively, the light-emitting element 20 may be a micro-LED or sub-millimeter LED. The present disclosure does not limit the type of the light-emitting element 20. In descriptions below, the display panel 100 is an OLED display panel exemplarily.

Optionally, the display panel 100 includes sub-pixels 00 that are arranged in an array. That is, the sub-pixels 00 are arranged along the first direction X to form rows of sub-pixels 00, and the rows of the sub-pixels 00 are arranged along the second direction Y. The sub-pixels 00 are arranged along the second direction Y to form columns of the sub-pixels 00, and the columns of the sub-pixels 00 are arranged along the first direction X. As such, an array structure is formed by the sub-pixels 00. The first direction X and second direction Y intersects or are perpendicular to each other in a plane parallel to the plane where the display panel 100 is located. Alternatively, the sub-pixels 00 may also be arranged in other ways. FIG. 1 exemplarily uses an array arrangement of the sub-pixels 00. The sub-pixel 00 forms pixel rows along the first direction X. The display panel scans the pixel rows in a row-by-row manner during a drive operation.

Optionally, the sub-pixel 00 includes the pixel circuit 10 and light-emitting element 20 that are electrically connected. The pixel circuit 10 is used to control the light-emitting element 20 to emit light. Since the light-emitting element 20 in the OLED display panel 100 is generally an OLED, and an OLED is a current-driven device, a corresponding pixel circuit 10 is needed to provide a drive current for the light-emitting element 20 to emit light. The pixel circuit 10 at least includes the drive module 101, first reset module 102, and compensation module 103.

The drive module 101 and light-emitting element 20 are connected in series between the first and second power supply voltage signal terminals PVDD and PVEE. Optionally, the drive module 101 includes a drive transistor M0. A first electrode of the drive transistor M0 is electrically connected to the first power supply voltage signal terminal PVDD. A second electrode of the drive transistor M0 is electrically connected to the second power supply voltage signal terminal PVEE. The drive transistor M0 is used to generate a drive current. In some cases, the first electrode of the drive transistor M0 is the source of the drive transistor M0, and the second electrode of the drive transistor M0 is the drain of the drive transistor M0. In some other cases, the first electrode of the drive transistor M0 is the drain of the drive transistor M0, and the second electrode of the drive transistor M0 is the source of the drive transistor M0. With regard to the drive transistor M0, its gate is connected to a first node N1, its source is connected to a second node N2, and its drain is connected to a third node N3.

The first reset module 102 is electrically connected to the control terminal of the drive module 101, and used to initialize the control terminal of the drive module 101. When the first reset module 102 is turned on, the control terminal voltage of the drive module 101 is the reset signal VREF input by the first reset module 102. The control terminal of the drive module 101 is reset, and the drive module 101 may be turned on during threshold compensation. Optionally, the first reset module 102 includes a first transistor M1. The gate of the first transistor M1 inputs the first control signal S1. The first electrode of the first transistor M1 inputs the reset signal VREF. The second electrode of the first transistor M1 is electrically connected to the gate of the drive transistor M0. When the first transistor M1 is turned on, the reset signal VREF is input to the gate of the drive transistor M0. The gate of the drive transistor M0 is reset, which facilitates turning on the drive transistor M0 during threshold compensation.

The compensation module 103 is connected in series between the control terminal of the drive module 101 and the second terminal of the drive module 101 to compensate the voltage of the control terminal of the drive module 101. Optionally, the compensation module 103 is used to detect and compensate for the deviation of the threshold voltage of the drive transistor M0, and provide a compensated deviation of the threshold voltage to the drive transistor M0 to achieve threshold compensation for the drive transistor M0.

In FIG. 2, the drive transistor M0 is exemplarily a P-type transistor, and the first and second transistors M1 and M2 are exemplarily N-type transistors. Alternatively, the drive transistor M0 may be an N-type transistor, and the first and second transistors M1 and M2 may be P-type transistors in some other cases.

Optionally, the connection structure of the pixel circuit 10 is not limited to the above-mentioned structure and drive timing, and may include other connection structures and drive methods besides that illustrated above.

Referring to FIG. 1, the peripheral circuit 30 schematically includes a first gate drive circuit 301 and a second gate drive circuit 302. The drive chip IC sends a start signal STV_S1 to the first stage of the first gate drive circuit 301. The first gate drive circuit 301 provides a first control signal S1 to the pixel circuit 10 stage by stage. The drive chip IC sends a start signal STV_S2 to the first stage of the second gate drive circuit 302. The second gate drive circuit 302 provides a second control signal S2 to the pixel circuit 10 stage by stage. The peripheral drive circuit 30 also includes a third gate drive circuit 303. The drive chip IC sends a start signal STV_E to the first stage of the third gate drive circuit 303. The third gate drive circuit 303 provides a third control signal E to the pixel circuit 10 stage by stage. The first and second power supply voltages VPvdd and VPvee and reset signal VREF are also provided by the drive chip IC. FIG. 1 shows a first scan signal line 1, a second scan signal line 2, a reset signal line 3, a first power supply voltage signal line 5, and a third control signal line 4. The first scan signal line 1 is used to transmit the first control signal S1. The second scan signal line 2 is used to transmit the second control signal S2. The reset signal line 3 transmits the reset signal VREF. The third control signal line 4 transmits the third control signal E. The description above is only schematic for illustration. In FIG. 4, STV_E represents a trigger start signal of the third control signal E.

Figure 3:
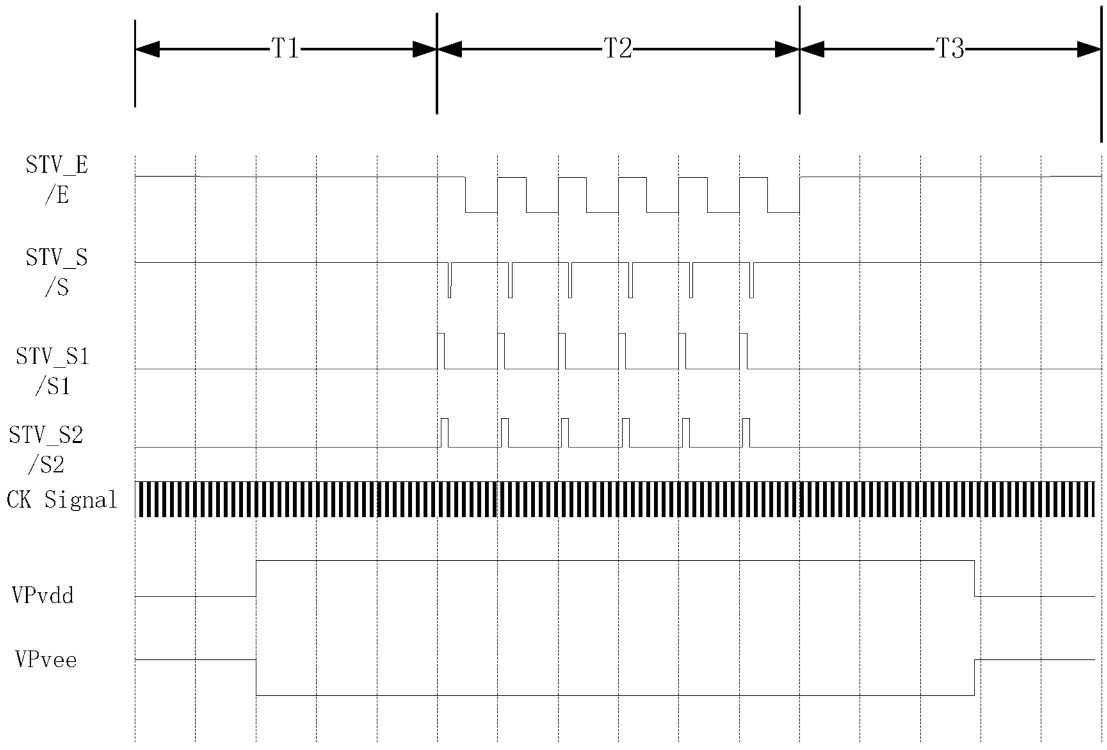
FIG. 3 shows a work timing diagram of a pixel circuit.

FIG. 3 shows a work timing diagram of a pixel circuit. The figure shows that the display panel includes the power-on stage T1, display stage T2, and a power-off stage T3. E is the third control signal. S is the fourth control signal that controls turn-on of a data write module. S1 is the first control signal. S2 is the second control signal. CK signal is a clock signal. VPvdd is the first power supply voltage. VPvee is the second power supply voltage. VREF is the reset signal VREF. At the end the power-on stage T1 (the part close to the display stage T2), the first and second power supply voltages VPvdd and VPvee are provided. At the display stage T2, signals simultaneously output to the pixel circuit 10 include the first control signal S1, second control signal S2, fourth control signal S, third control signal E, reset signal VREF, first power supply voltage VPvdd, second power supply voltage VPvee, and other signals. When the display panel is turned off, display images of a previous frame and static electricity may cause residual charges. As a consequence, the screen may flicker when the power is turned on.

Figure 13:
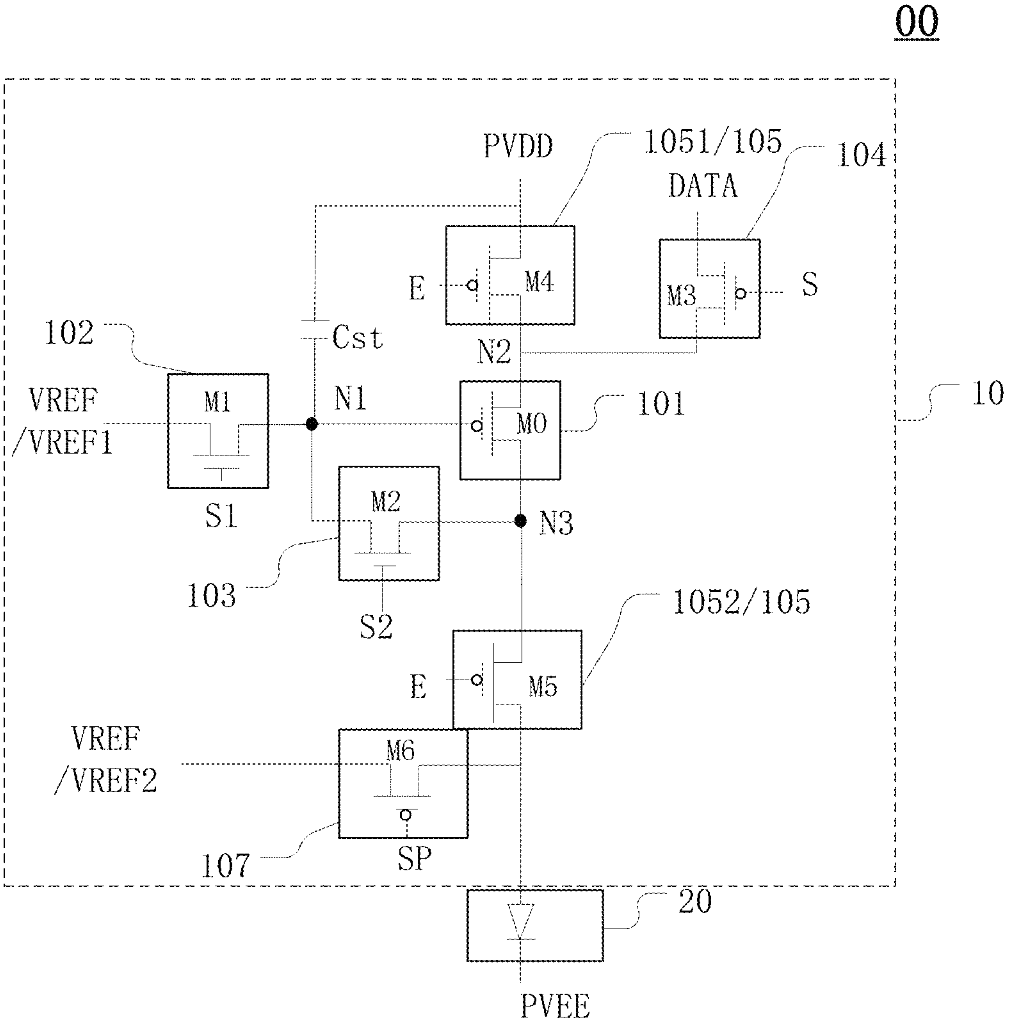
FIG. 13 shows another schematic diagram of a circuit connection structure of a sub-pixel in FIG. 1 according to various disclosed embodiments of the present disclosure.

E is the third control signal, and S is the fourth control signal that controls turn-on of a data write module (not shown in FIG. 2, please refer to FIG. 13). STV_S represents a trigger start signal of the fourth control signal S. S1 is the first control signal. S2 is the second control signal. The CK signal is the clock signal. VPvdd is the first power supply voltage. VPvee is the second power supply voltage. VREF is the reset signal. The first phase T11 and second phase T12 of the power-on stage T1 in FIG. 4 both provide the first and second control signals S1 and S2. Exemplarily, the first control signal S1 is a pulse signal, and the second control signal S2 is a high-voltage signal. Alternatively, the first and second control signals S1 and S2 are provided in the second phase T12, as shown in FIG. 5. In FIG. 5, the first and second control signals S1 and S2 are provided only in the second phase T12, as it is needed that the first reset module 102 and compensation module 103 are turned on at the power-on stage T1. The first and second control signals S1 and S2 are high voltages, since the first and second transistors M1 and M2 are N-type transistors and turn on at high voltage. If the first and second transistors M1 and M2 are P-type transistors, the first and second control signals S1 and S2 need to be low voltages.

The power-on stage T1 is before the display stage T2. The power-on stage T1 includes the first phase T11 and second phase T12 in sequence. In the first phase T11, the peripheral drive circuit 30 only provides the first control signal S1 to the control terminal of the first reset module 102 of the pixel circuit 10. Since the second node N2 is connected to the first power supply voltage VPvdd of the first power supply voltage signal terminal PVDD when the last image is displayed, positive charges accumulate at the second node N2. These charges are stored at parasitic capacitors. When the first control signal S1 controls the first reset module 102 to turn on and the second control signal S2 controls the compensation module 103 to turn on, because of Vgs<Vth for the drive transistor M0, the drive transistor M0 is turned on, and the remaining charges are released until the drive transistor M0 is turned off. Subsequently, in the early period of the display stage T2, the light-emitting element 20 does not flicker.

In FIG. 4, the second control signal S2 maintains a high voltage. The first control signal S1 is a pulse signal. After the first control signal S1 turns off the first reset module 102 of the current row, since the compensation module 103 is still on, remaining charges may still be released to storage capacitors Cst until the drive transistor M0 is turned off. Since residual charges of previous display images are released at the power-on stage T1, the light-emitting element 20 does not flicker subsequently in the early period of the display stage T2.

Figure 6:
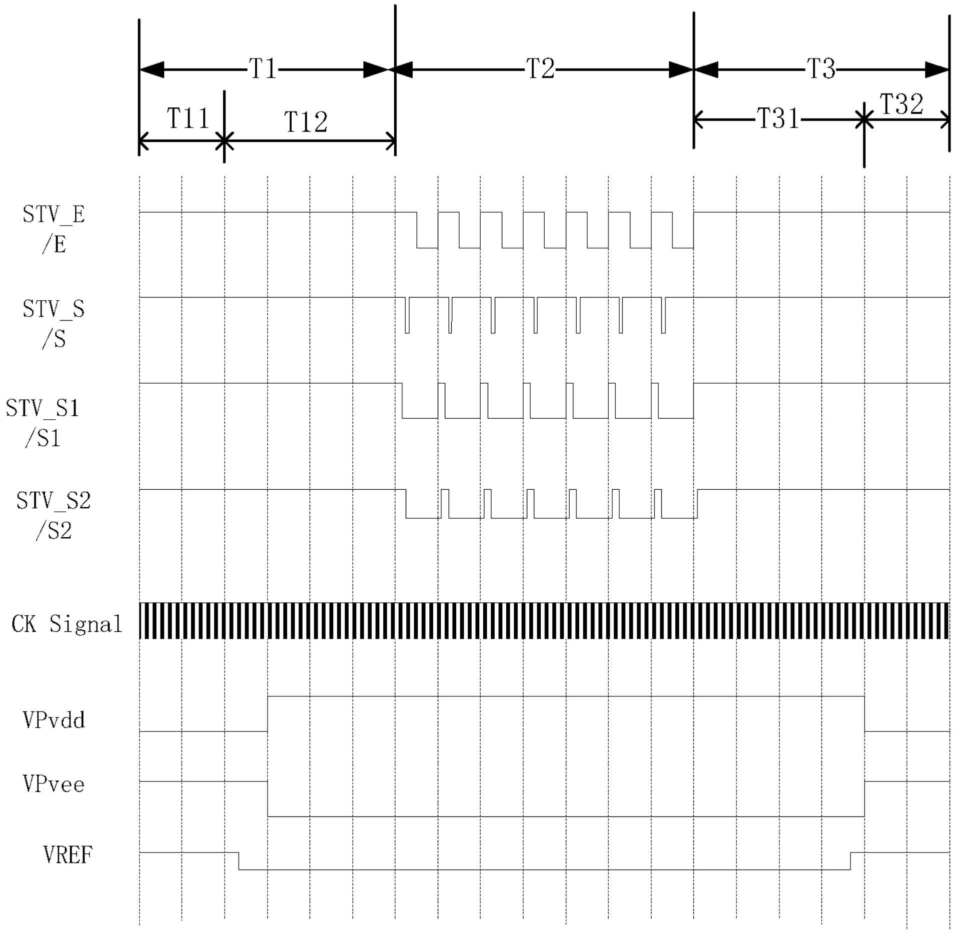
FIG. 6 shows another work timing diagram of a pixel circuit in FIG. 2 according to various disclosed embodiments of the present disclosure.

FIG. 6 illustrates another work timing diagram of the pixel circuit in FIG. 2 according to the present disclosure. Referring to FIG. 6, during a period of at least part of frames at the power-on stage T1, the first control signal S1 maintains an effective voltage. During a period of at least part of frames at power-on stage T1, the second control signal S2 maintains an effective voltage.

The first and second transistors M1 and M2 are N-type transistors exemplarily. Referring to FIG. 6, during the entire frame period of the power-on stage T1, the first control signal S1 maintains a high voltage, and simultaneously the second control signal S2 maintains a high voltage. Alternatively, the first control signal S1 may maintain a high voltage and the second control signal S2 may maintain a high voltage during the period of at least part of frames of the power-on stage T1. When the first and second transistors M1 and M2 are P-type transistors, during the period of at least part of frames of the power-on stage T1, the first control signal S1 may maintain a low voltage, and at the same time, the second control signal S2 may maintain a low voltage.

The first and second transistors M1 and M2 in FIG. 2 are exemplarily N-type transistors in FIG. 2. When the first control signal S1 is a high voltage, the first reset module 102 is turned on. When the second control signal S2 is a high voltage, the compensation module 103 is turned on. The reset signal VREF is written into the control terminal of the drive module 101. Because of Vgs<Vth for the drive transistor M0, the drive transistor M0 is turned on. The second control signal S2 remains a high voltage. The compensation module 103 is turned on. Therefore, remaining charges are released to the storage capacitor Cst until the drive transistor M0 is turned off. At the power-on stage T1, residual charges of previous display images have been released. As such, there is no flickering problem when entering the display stage T2.

Optionally, the first and second transistors M1 and M2 are P-type transistors. When the first control signal S1 is a low voltage, the first reset module 102 is turned on. When the second control signal S2 is a low voltage, the compensation module 103 is turned on. The reset signal VREF is written into the control terminal of the drive module 101. Because of Vgs<Vth for the drive transistor M0, the drive transistor M0 is turned on. The second control signal S2 remains a low voltage. The compensation module 103 is turned on. Therefore, remaining charges are released to the storage capacitor Cst until the drive transistor M0 is turned off. At the power-on stage T1, residual charges of previous display images have been released. As such, there is no flickering problem at the beginning of the display stage T2.

During the period of at least part of frames at the power-on stage T1, the first control signal S1 maintains an effective voltage, and the second control signal S2 maintains an effective voltage. Then during this period of at least part of frames at the power-on stage T1, it is equivalent to all pixel rows performing electrostatic discharge at the same time. It takes less time than electrostatic discharge pixel row by pixel row, and has high electrostatic discharge efficiency. For example, a display panel consists of 2000 rows of pixels. If electrostatic discharge is performed row by row, the total duration of electrostatic discharge is kl. When the first and second control signals S1 and S2 maintain effective voltages, respectively, all 2000 pixel rows undergo electrostatic discharge simultaneously. The total time of electrostatic discharge is only kl/2000. The time of electrostatic discharge is greatly shortened. The efficiency of electrostatic discharge is improved.

Figure 7:
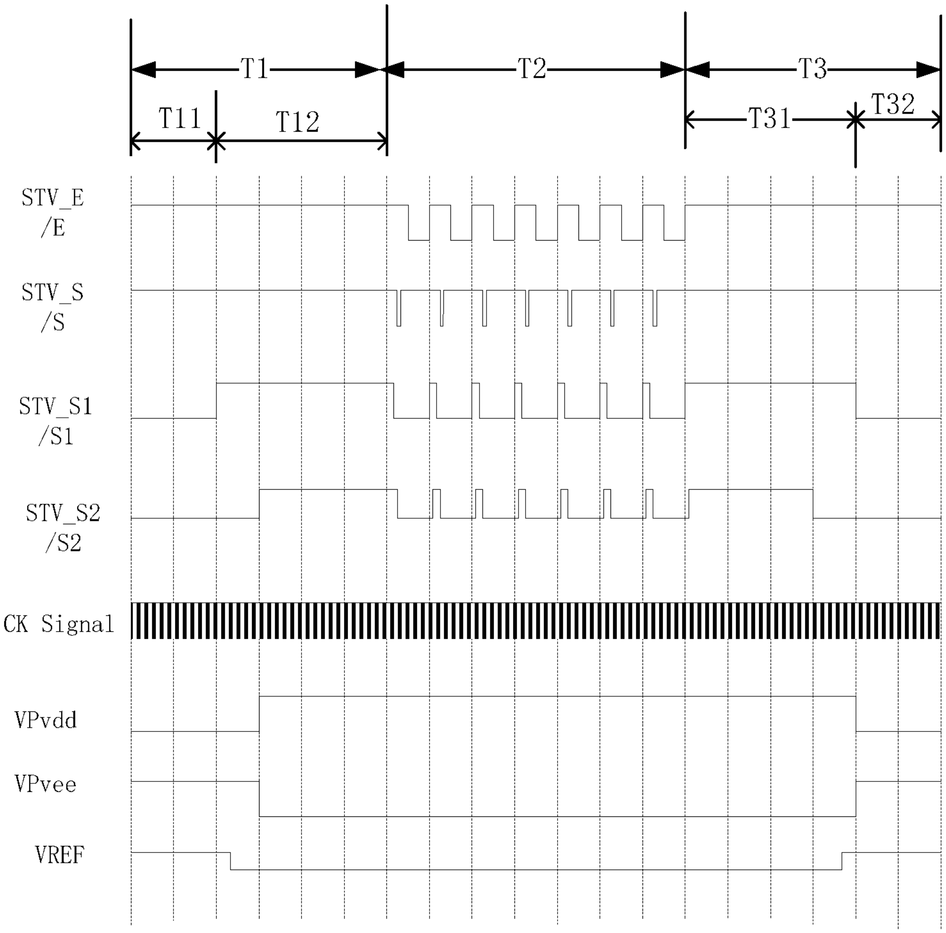
FIG. 7 shows another work timing diagram of a pixel circuit in FIG. 2 according to various disclosed embodiments of the present disclosure.

FIG. 7 illustrates another work timing diagram of the pixel circuit in FIG. 2 according to the present disclosure. Within a period of n consecutive frames at the power-on stage, for the i-th frame, the first control signal S1 maintains an effective voltage, and the second control signal S2 maintains a non-effective voltage. The first and second control signals S1 and S2 for the i+1th frame both maintain effective voltages. n is a positive integer greater than or equal to 2, i is a positive integer, and i is less than or equal to n−1.

The first and second transistors M1 and M2 are N-type transistors exemplarily. In FIG. 7, the power-on stage T1 includes 6 frames exemplarily. At the third frame, the first control signal S1 maintains a high voltage. The second control signal S2 maintains a low voltage from the first frame to the third frame. At the fourth frame, the first and second control signals S1 and S2 maintain high voltages. That is, the start time when the second control signal S2 inputs a high voltage is after the first control signal S1 inputs a high voltage. The number of frames of the power-on stage T1 in FIG. 7 is only a schematic illustration.

In some cases, the display stage T2 may directly follow the consecutive n frames. Alternatively, the display stage T2 may not directly follow the consecutive n frames. The purpose is to release static electricity of previous display images at the power-on stage T1 and prevent flickering in the early period of the display stage T2.

As shown in FIG. 7, the first control signal S1 of the i-th frame is a high voltage. At this time, the first reset module 102 is turned on. The reset signal VREF is written into the control terminal of the drive module 101. The reset signal VREF is a high voltage. The drive module 101 is turned on, and the compensation module 103 is not turned on for the i-th frame. For the i+1th frame, the second control signal S2 is a high voltage. The compensation module 103 is turned on. Since the first reset module 102 has been in an on state since the i-th frame, the drive module 101 is also in an on state. So when the compensation module 103 is turned on, remaining charges are released to the storage capacitor Cst until the drive transistor M0 is turned off and residual charges of previous display images have been released at the power-on stage T1.

Electrostatic discharge is performed at the power-on stage T1, preventing the light-emitting element 20 from flickering in the early period of the display stage T2. Further, the first control signal S1 of the i-th frame maintains an effective voltage, and the second control signal S2 maintains a non-effective voltage. The first and second control signals S1 and S2 of the i+1th frame maintain effective voltages, which may reduce the load. If the first and second control signals S1 and S2 simultaneously control the first reset module 102 and compensation module 103 to turn on, it is equivalent to releasing charges of storage capacitors of the first node N1 at the same time and residual charges of parasitic capacitors of the second node N2 and third node N3. In the present disclosure, the first control signal S1 controls the first reset module 102 to turn on, and then the second control signal S2 controls the compensation module 103 to turn on. As such, only charges of storage capacitors of the first node N1 are released at first. Then remaining charges at the second node N2 and third node N3 are released. Load problems after turning on all pixel rows at the same time may be reduced.

Referring to FIG. 4, at the power-on stage, the second control signal S2 maintains an effective voltage, the first control signal S1 is a pulse signal, and the peripheral drive circuit 30 transmits pulse signals to the control terminal of the first reset module 102 row by row.

The first and second transistors M1 and M2 are N-type transistors exemplarily. In FIG. 4, the first control signal S1 is a pulse signal, the second control signal S2 maintains a high voltage continuously, and the peripheral drive circuit 30 transmits pulse signals to the control terminal of the first reset module 102 row by row. The pulse signals include some high voltage signals. When the pulse signal is an effective pulse, the first reset module 102 is turned on. The reset signal VREF is written into the control terminal of the drive module 101. Electrostatic discharge is performed at the first node N1. The reset signal VREF is a high voltage. The drive module 101 is turned on. The second control signal S2 is a high voltage. When the compensation module 103 is turned on, electrostatic discharge is performed at the second and third nodes N2 and N3. The light-emitting element 20 is prevented from flickering in the early period of the display stage T2.

Optionally, when the first and second transistors M1 and M2 are P-type transistors, the first control signal S1 is a pulse signal, the effective pulse is a low voltage, and the second control signal S2 may maintain a low voltage.

At the power-on stage T1, the first control signal S1 is a pulse signal. Electrostatic discharge is performed at the first node N1 pixel row by pixel row. As such, the instantaneous load of the reset signal VREF is relatively small. Because at the subsequent display stage T2, the reset signal VREF is transmitted pixel row by pixel row, it does not require big load capacity. If at the power-on stage T1, electrostatic discharge is performed at the first nodes N1 of all pixel rows at the same time, the reset signal VREF requires a big capacity. The reset signal VREF needs to occupy a large space at the drive chip IC.

Referring to FIGS. 1, 2, and 4, at the display stage T2, the peripheral drive circuit 30 provides the first display control signal 3 to the control terminal of the first reset module 102.

At the power-on stage T1, the effective pulse width of the first control signal S1 is equal to that of the first display control signal 3.

Figure 8:
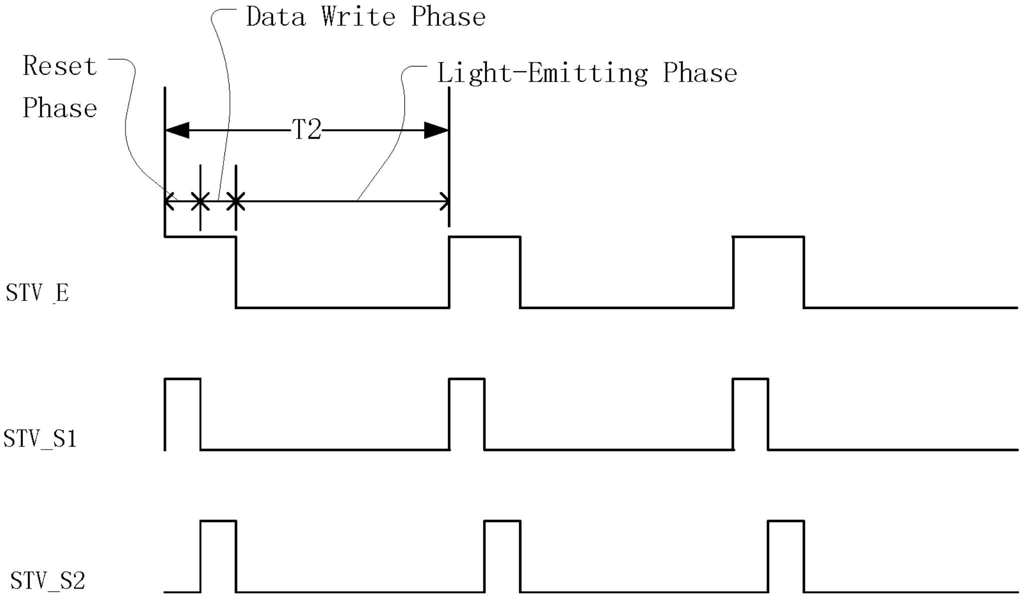
FIG. 8 shows a timing diagram at a display stage according to various disclosed embodiments of the present disclosure.

FIG. 8 illustrates a timing diagram at a display stage according to the present disclosure. The display stage T2 includes a reset phase, a data write phase, and a light-emitting phase. The peripheral drive circuit 30 inputs the first display control signal 3 to the control terminal of the first reset module 102. The first display control signal 3 is also a pulse signal. It ensures that turning on the first reset module 102 resets the control terminal of the drive module 101 when the pulse signal is an effective pulse.

At the power-on stage T1, the effective pulse width of the first control signal S1 is equal to that of the first display control signal 3. The first control signals S1 provided by the peripheral drive circuit 30 are the same. There is no need to switch or change the first control signal S1 at the power-on stage T1 and the first display control signal 3 at the display stage T2. It may lower the work pressure on the drive chip IC and also reduce the power consumption.

Figure 9:
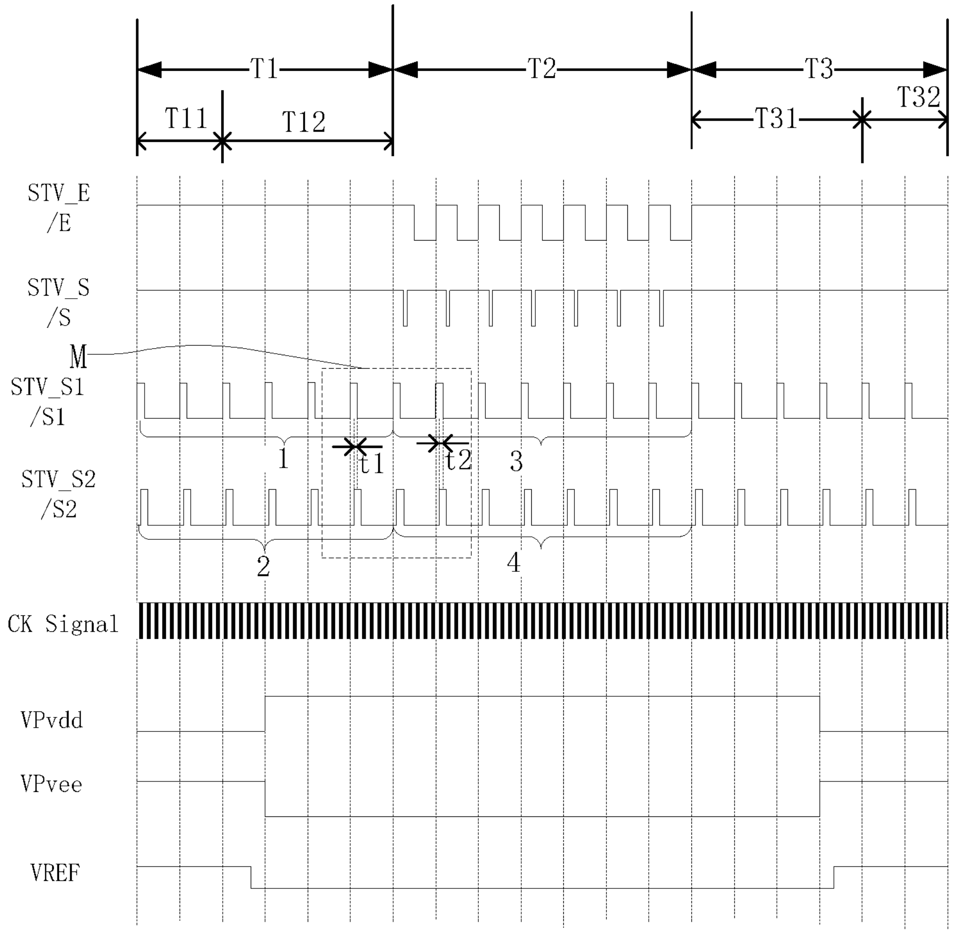
FIG. 9 shows another work timing diagram of a pixel circuit in FIG. 2 according to various disclosed embodiments of the present disclosure.

FIG. 9 illustrates another work timing diagram of the pixel circuit in FIG. 2 according to the present disclosure. The first control signal S1 is the first pulse signal 1. The second control signal S2 is the second pulse signal 2. The peripheral drive circuit 30 transmits the first pulse signal 1 to the control terminal of the first reset module 102 row by row. The peripheral drive circuit 30 transmits the second pulse signal 2 to the control terminal of the compensation module 103 row by row. The effective pulse of the first pulse signal 1 at least partially overlaps with that of the second pulse signal 2.

In FIG. 9, the first and second control signals S1 and S2 are both pulse signals. The first control signal S1 is the first pulse signal 1. The effective pulse of the first pulse signal 1 controls the first reset module 102 to turn on. The reset signal VREF is written into the control terminal of the drive module 101. The reset signal VREF is a high voltage. The drive module 101 is turned on. The second control signal S2 is the second pulse signal 2. The effective pulse of the second pulse signal 2 controls the compensation module 103 to turn on. In some cases, the effective pulses of the first and second pulse signals 1 and 2 overlap. The start time of the effective pulse of the second pulse signal 2 is located between the start time and end time of the effective pulse of the first pulse signal 1. The end time of the effective pulse of the second pulse signal 2 is located after the end time of the effective pulse of the first pulse signal 1. The end time of the effective pulse of the first pulse signal 1 is between the start time and end time of the effective pulse of the second pulse signal 2.

Optionally, the effective pulses of the first and second pulse signals 1 and 2 at least partially overlap. After the effective pulse of the first pulse signal 1 is transmitted to the first reset module 102, the first reset module 102 is turned on. Electrostatic discharge is performed at the first node N1. When the effective pulse of the first pulse signal 1 has not stopped, the effective pulse of the second pulse signal 2 is transmitted to the compensation module 103. The compensation module 103 is turned on. Electrostatic discharge is conducted at the second node N2 and third node N3. It prevents the light-emitting element 20 from flickering in the early period of the display stage T2.

Optionally at the power-on stage T1, both the first and second control signals S1 and S2 are pulse signals. Electrostatic discharge is performed at the first node N1, second node N2, and third node N3 pixel row by pixel row. As such, the instantaneous load of the reset signal VREF is relatively small. Because at the subsequent display stage T2, the reset signal VREF is transmitted pixel row by pixel row, large load capacity is not needed. If at the power-on stage T1, electrostatic discharge is performed at the first nodes N1 of all pixel rows at the same time, the reset signal VREF may require a large load capacity. The reset signal VREF may need to occupy a big space at the drive chip IC. Arranging a high voltage only when there is an effective pulse, while arranging a low voltage when there is a non-effective pulse. Power consumption during periods of non-effective pulses may be saved.

The start time of the effective pulse of the second pulse signal 2 is located between the start time and end time of the effective pulse of the first pulse signal 1. First, the first reset module 102 is turned on through the first control signal S1. Then, the compensation module 103 is turned on through the second control signal S2. Only charges of storage capacitors at the first node N1 are released first. Then, remaining charges at the second node N2 and third node N3 are released. This reduces load issues when all pixel rows are turned on at the same time. If the first and second control signals S1 and S2 simultaneously control the first reset module 102 and compensation module 103 to turn on, charges of storage capacitors at the first node N1 need to be released at the same time, and residual charges of parasitic capacitors at the second and third nodes N2 and N3 also need to be released.

Figure 10:
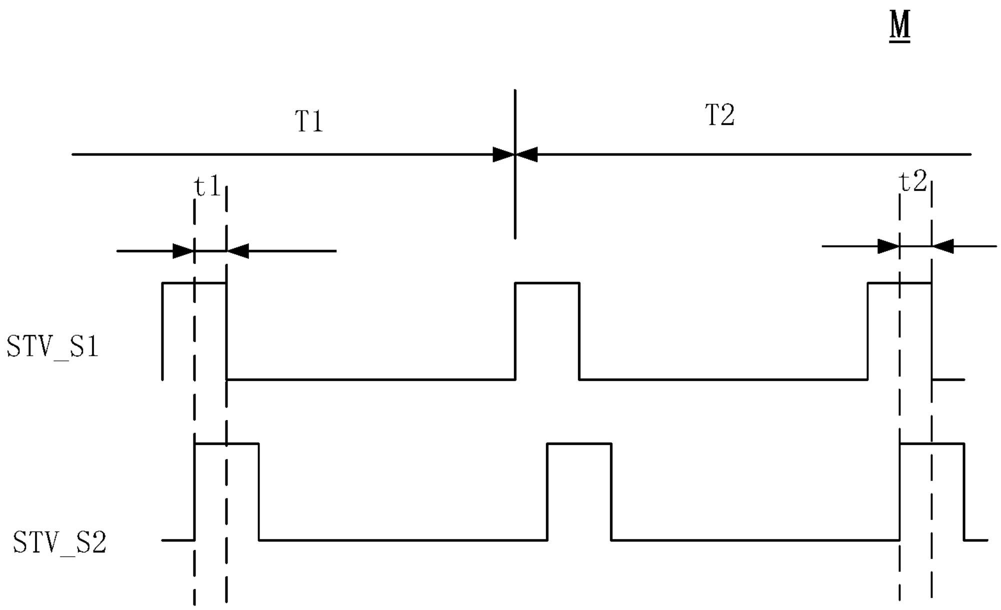
FIG. 10 shows a partial enlargement of a region M in FIG. 9 according to various disclosed embodiments of the present disclosure.

FIG. 10 illustrates a partial enlargement of a region M in FIG. 9 according to the present disclosure. At the power-on stage T1, the time during which the effective pulse widths of the first and second pulse signals 1 and 2 overlap is t1.

At the display stage T2, the peripheral drive circuit 30 provides a first display control signal 3 to the control terminal of the first reset module 102, and provides a second display control signal 4 to the control terminal of the compensation module 103. At the display stage T2, the time during which the effective pulse widths of the second and first display control signals 4 and 3 overlap is t2. It is arranged that t1=t2.

At the power-on stage T1, the effective pulses of the first and second pulse signals 1 and 2 overlap. The start time of the effective pulse of the second pulse signal 2 is located between the start time and end time of the effective pulse of the first pulse signal 1. The end time of the effective pulse of the second pulse signal 2 is located after the end time of the effective pulse of the first pulse signal 1. The end time of the effective pulse of the first pulse signal 1 is between the start time and end time of the effective pulse of the second pulse signal 2. The time when the effective pulse widths of the first and second pulse signals 1 and 2 overlap is t1.

At the display stage T2, the start time of the effective pulse of the second display control signal 4 is between the start time and end time of the effective pulse of the first display control signal 3. The end time of the effective pulse of the first display control signal 3 is between the start time and end time of the effective pulse of the second display control signal 4. The time during which the effective pulse widths of the second and first display control signals 4 and 3 overlap is t2.

It is arranged that t1=t2. The first display control signal 3 provided by the peripheral drive circuit 30 and the first pulse signal 1 are the same. The second display control signal 4 provided by the peripheral drive circuit 30 and the second pulse signal 2 are the same. There is no need to change the first pulse signal 1 at the power-on stage T1 and the first display control signal 3 at the display stage T2. There is no need to change the second pulse signal 2 at the power-on stage T1 and the second display control signal 4 at the display stage T2. It may lower the work pressure of the drive chip IC and reduce the power consumption.

At the display stage T2, the start time of the effective pulse of the second display control signal 4 is between the start time and end time of the effective pulse of the first display control signal 3. At the display stage T2, the first reset module 102 is first turned on through the first display control signal 3. Then, the compensation module 103 is turned on through the second display control signal 4. That is, the first node N1 is reset first, and then the second node N2 and third node N3 are reset. It may reduce the load problem after all pixel rows are turned on at the same time. If the first and second display control signals 3 and 4 simultaneously control the first reset module 102 and compensation module 103 to turn on, it is needed to reset the first node N1, second node N2, and third node N3 at the same time.

Figure 11:
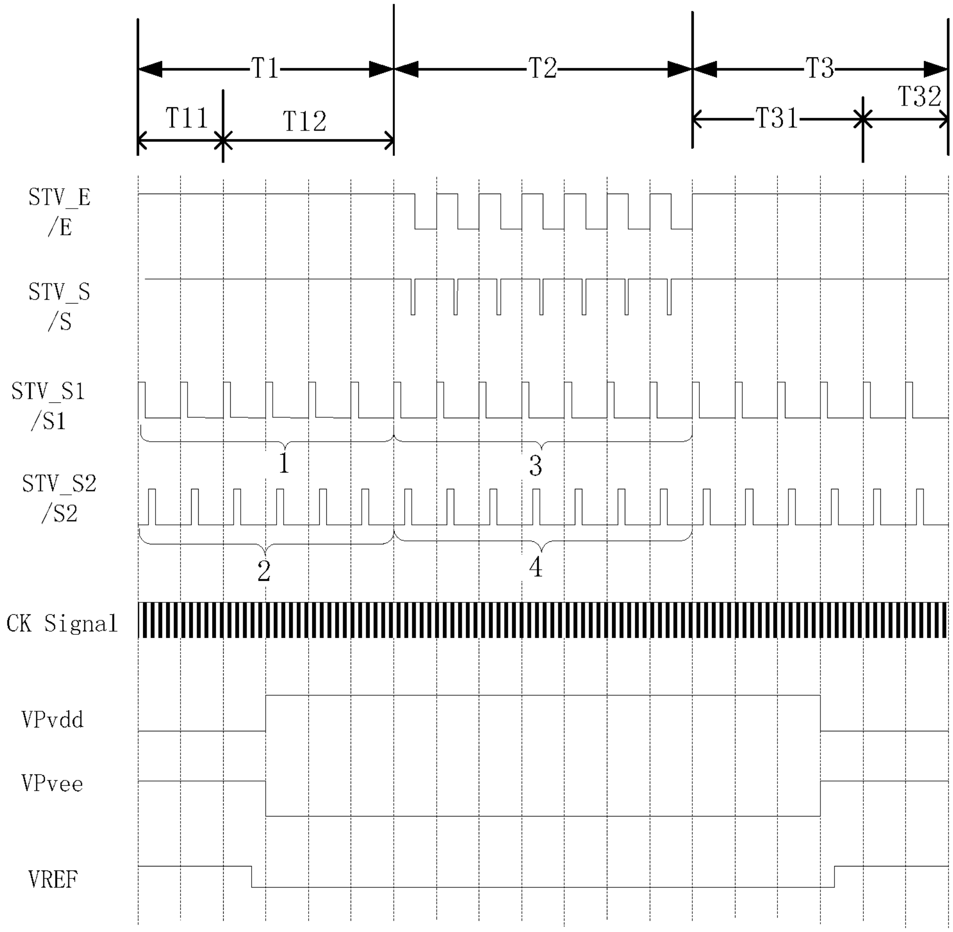
FIG. 11 shows another work timing diagram of a pixel circuit in FIG. 2 according to various disclosed embodiments of the present disclosure.

FIG. 11 illustrates another work timing diagram of the pixel circuit in FIG. 2 according to the present disclosure. The first control signal S1 is the first pulse signal 1. The second control signal S2 is the second pulse signal 2. The peripheral drive circuit 30 transmits the first pulse signal 1 to the control terminal of the first reset module 102 row by row. The peripheral drive circuit 30 transmits the second pulse signal 2 to the control terminal of the compensation module 103 row by row. At each frame, the start time of the effective pulse of the second pulse signal 2 is located after the end time of the effective pulse of the first pulse signal 1.

In FIG. 11, the effective pulses of the first and second pulse signals 1 and 2 do not overlap. The start time of the effective pulse of the second pulse signal 2 is located after the end time of the effective pulse of the first pulse signal 1. Thus, the first and second pulse signals 1 and 2 have no overlap. When the first pulse signal 1 is an effective pulse, the first reset module 102 is turned on. The reset signal VREF is written into the control terminal of the drive module 101. The reset signal VREF is a high voltage (effective voltage). The drive module 101 is turned on. When the first pulse signal 1 is an effective pulse, the second pulse signal 2 is a non-effective pulse. After the effective pulse of the first pulse signal 1 terminates, the second pulse signal 2 becomes an effective pulse. The compensation module 103 is turned on.

On the one hand, at the power-on stage T1, the first and second control signals S1 and S2 are both pulse signals. As such, electrostatic discharge may be performed at the first node N1, second node N2, and third node N3 pixel row by pixel row. The instantaneous load of the reset signal VREF is relatively small. Because at the subsequent display stage T2, the reset signal VREF is transmitted pixel row by pixel row, a large load capacity is not needed. If at the power-on stage T1, electrostatic discharge is performed at the first nodes N1 of all pixel rows at the same time, the reset signal VREF requires a large load capacity. The reset signal VREF needs to occupy a big space at the drive chip IC. A high voltage is provided only with the effective pulse, and a low voltage is provided with a non-effective pulse. Power consumption may be saved during the period of non-effective pulses.

On the other hand, at each frame of the power-on stage T1, the start time of the effective pulse of the second pulse signal 2 is located after the end time of the effective pulse of the first pulse signal 1. First, the first reset module 102 is turned on through the first control signal S1. Then, the compensation module 103 is turned on through the second control signal S2. Thus, only charges of the storage capacitor at the first node N1 are released first, and then remaining charges at the second node N2 and third node N3 are released. The load problem after turning on all pixel rows at the same time is reduced. If the first and second control signals S1 and S2 simultaneously control the first reset module 102 and compensation module 103 to turn on, it is needed to simultaneously release charges of the storage capacitor of the first node N1 and residual charges of parasitic capacitors of the second node N2 and third node N3.

Referring to FIG. 11, at the display stage, the peripheral drive circuit 30 provides the first display control signal 3 to the control terminal of the first reset module 102. The peripheral drive circuit 30 provides the second display control signal 4 to the control terminal of the compensation module 103.

The pulse width of the first pulse signal 1 at the power-on stage T1 is equal to the pulse width of the first display control signal 3 at the display stage T2.

The pulse width of the second pulse signal 2 is equal to the pulse width of the second display control signal 4 at the display stage T2.

At the display stage T2, when one frame ends and the next frame starts, the drive module 101 also needs to be reset. The peripheral drive circuit 30 inputs the first display control signal 3 to the control terminal of the first reset module 102, and provides the second display control signal 4 to the control terminal of the compensation module 103. The first and second display control signals 3 and 4 are pulse signals. It ensures that the first reset module 102 and compensation module 103 are turned on when the pulse signal is a high voltage, and the control terminal, first terminal, and second terminal of the drive module 101 are reset.

Optionally, the effective pulse width of the first pulse signal 1 at the power-on stage T1 is equal to the pulse width of the first display control signal 3 at the display stage T2. The pulse width of the second pulse signal 2 is equal to the pulse width of the second display control signal 4 at the display stage T2. As such, the first pulse signal 1 and first display control signal 3 provided by the peripheral drive circuit 30 are the same. The second pulse signal 2 and the second display control signal 4 are the same. There is no need to change the first pulse signal 1 at the power-on stage T1 and the first display control signal 3 at the display stage T2. There is no need to change the second pulse signal 2 at the power-on stage T1 and the second display control signal 4 in the display stage T2. The work pressure on the drive chip IC is lowered and the power consumption is reduced.

At the display stage T2, the first reset module 102 is turned on through the first display control signal 3 first. Then the compensation module 103 is turned on through the second display control signal 4. Thus, the first node N1 is reset first. Then the second node N2 and third node N3 are reset. It may reduce the load problem when turning on all pixel rows at the same time. If the first and second display control signals 3 and 4 simultaneously control the first reset module 102 and compensation module 103 to turn on, it is needed to reset the first node N1, second node N2, and third node N3 at the same time.

Figure 14:
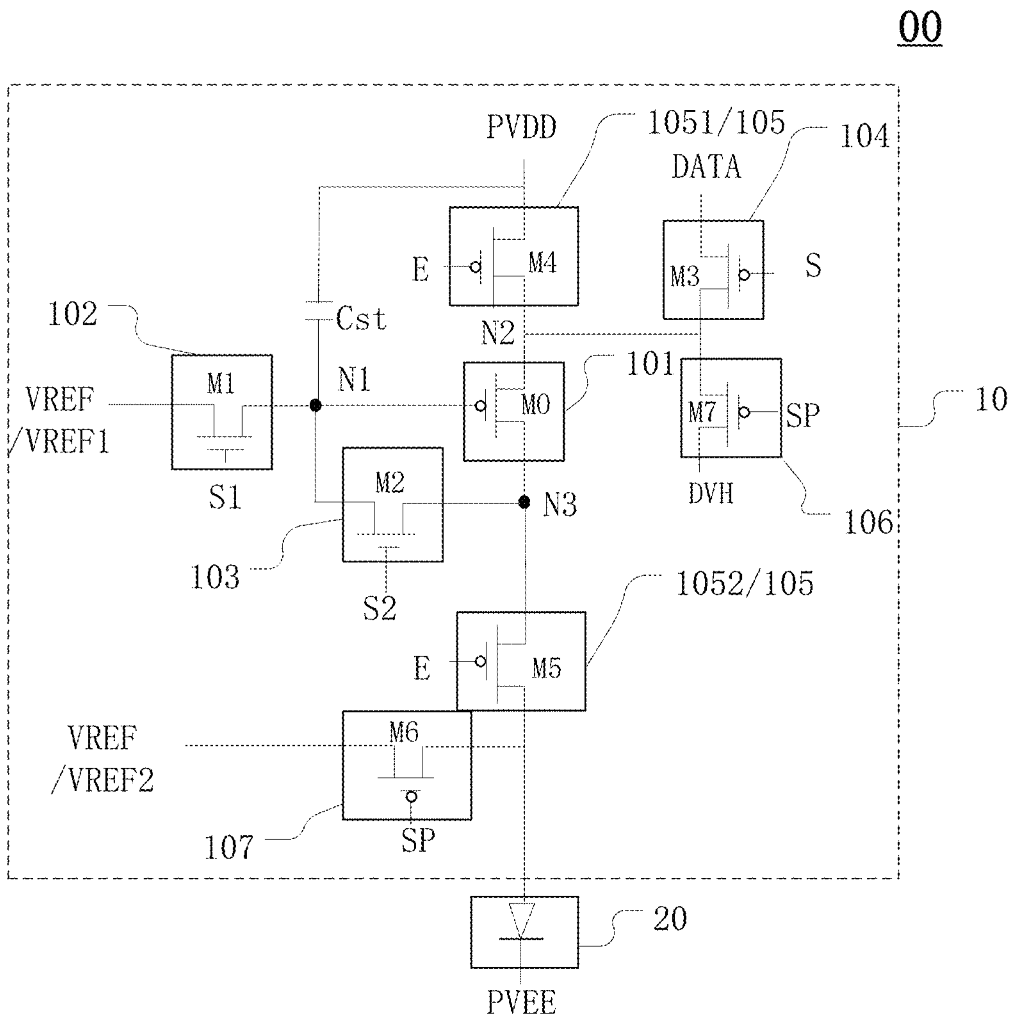
FIG. 14 shows another schematic diagram of a circuit connection structure of a sub-pixel in FIG. 1 according to various disclosed embodiments of the present disclosure.
Figure 15:
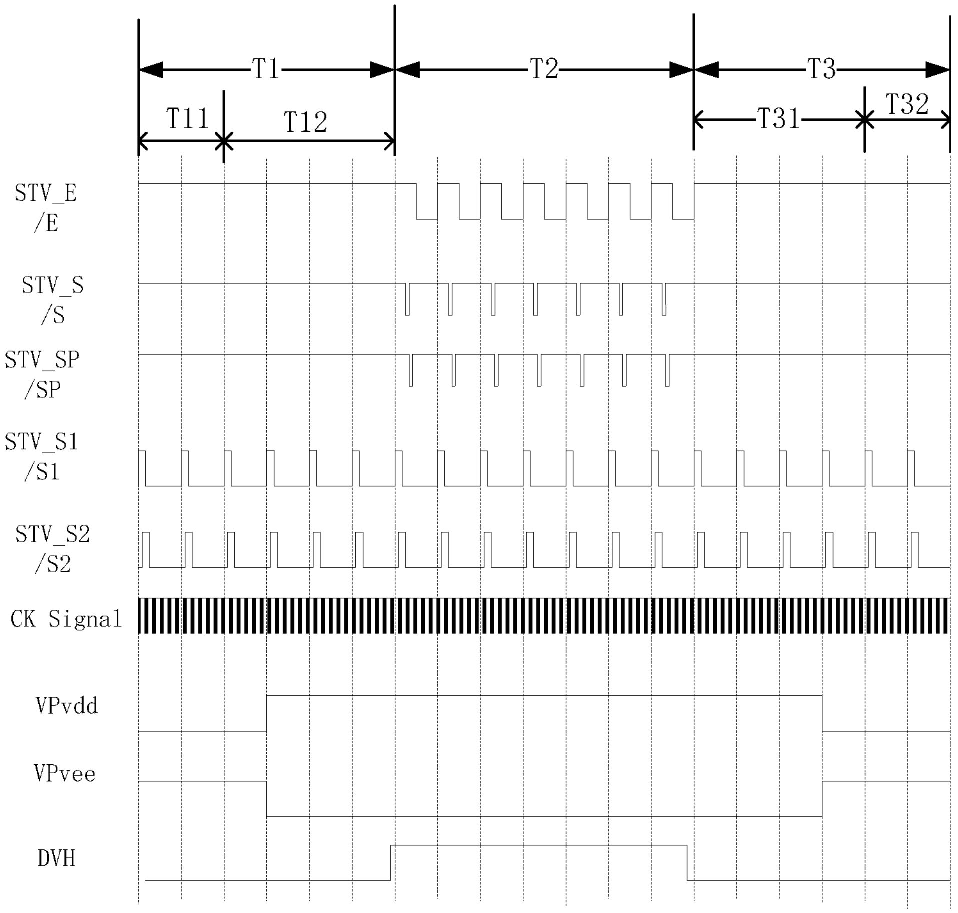
FIG. 15 shows a work timing diagram of a pixel circuit in FIG. 14 according to various disclosed embodiments of the present disclosure.

FIG. 14 illustrates another schematic diagram of a circuit connection structure of a sub-pixel in FIG. 1 according to the present disclosure. FIG. 15 illustrates a work timing diagram of the pixel circuit in FIG. 14 according to the present disclosure. The pixel circuit 10 further includes a data write module 104 for writing data signals into the drive module 101. The pixel circuit 10 further includes a bias module 106. An output terminal of the bias module 106 is electrically connected to the output terminal of the data write module 104 and the first terminal of the drive module 101, respectively. At the power-on stage T1, the peripheral drive circuit 30 transmits a fifth control signal SP to the control terminal of the bias module 106. The bias module 106 is turned on.

Optionally, the pixel circuit 10 is an 8T1C circuit. At the power-on stage, the peripheral drive circuit 30 transmits the fifth control signal SP to the control terminal of the bias module 106. The bias module 106 is turned on. A first terminal of the bias module 106 is electrically connected to the bias voltage DVH. A second terminal of the bias module 106 is electrically connected to the output terminal of the data write module 104 and the second node N2. The bias voltage DVH is written into the second node N2. Since the first control signal S1 controls the drive transistor M0 to turn on and the second control signal S2 controls the compensation module 103 to turn on, residual charges from previous display images may be released through the bias voltage DVH. That is, static charges at the second node N2 and third node N3 are removed.

At the power-on stage T1, when the bias module 106 is on, the data write module 104 is off. No data needs to be written at the power-on stage T1. Turning off the data write module 104 may reduce power consumption.

In addition at the display stage, the peripheral drive circuit 30 transmits the fifth control signal SP to the control terminal of the bias module 106. The bias module 106 is turned on. The bias module 106 is controlled to write the bias voltage DVH into the first terminal of the drive module 101 during part of the operation time of the pixel circuit 10. It may adjust the bias state of the drive module 101, improve the threshold drift problem of the drive module 101, and improve the display effect. At the display stage, the operation time of the bias module 106 is not limited, and only needs to be before the light-emitting element 20 emits light.

Optionally, the bias voltage DVH is provided by a bias signal line (not shown) at the display panel 100. Alternatively, the bias voltage DVH may also reuse certain drive signals in the pixel circuit 10, such as reusing the data signal DATA to achieve bias adjustment or when adjusting the bias voltage of the current row, reusing the data signal DATA of the next row to adjust the bias voltage of the drive module 101 of the current row. Optionally, the dynamic adjustment of the second power supply voltage VPvee and the bias voltage DVH may be directly performed through the second power supply voltage VPvee line (not shown) that supplies the second power supply voltage VPvee and the bias voltage signal line that supplies the bias voltage DVH. For example, the second power supply voltage VPvee line and the bias voltage signal line may be connected to the drive chip IC or a flexible circuit board bound on the display panel 100. The voltage signal input through the drive chip IC or the input pad of the flexible circuit board directly changes the dynamic values of the second power supply voltage VPvee and the bias voltage DVH. Alternatively, the bias voltage DVH may be dynamically adjusted by changing the on time of the bias module 106. For example, by controlling the maintenance time of the effective voltage of the fifth control signal SP, the value of the bias voltage DVH may also be adjusted to follow the dynamic change of the second power supply voltage VPvee. It may ensure the display quality of the display panel 100.

In the first phase T11, the peripheral drive circuit 30 only provides the first control signal S1 to the control terminal of the first reset module 102 of the pixel circuit 10. Electrostatic discharge is performed at the first node N1. The reset signal VREF is input to the control terminal of the drive module 101. The drive module 101 is turned on. The second control signal S2 is provided to the control terminal of the compensation module 103. The compensation module 103 is turned on. At the same time, the bias module 106 is turned on. Residual charges from previous display images are released through the bias voltage DVH, i.e., static charges at the second node N2 and the third node N3 are eliminated.

Figure 16:
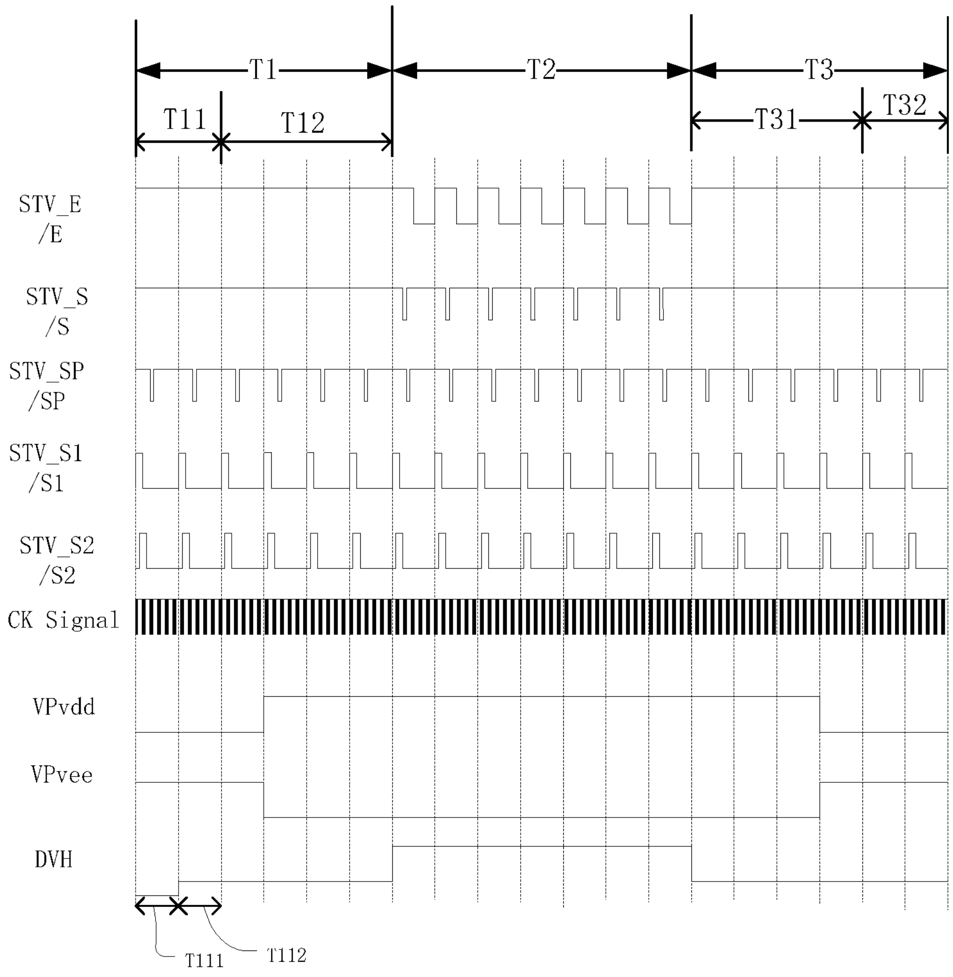
FIG. 16 shows another work timing diagram of a pixel circuit in FIG. 14 according to various disclosed embodiments of the present disclosure.

FIG. 16 illustrates another work timing diagram of the pixel circuit in FIG. 14 according to the present disclosure. The first phase T11 includes a first sub-phase T111 and a second sub-phase T112. The second sub-phase T112 is located in a time period of the first phase T11 that is close to the second phase T12. The voltage input to the input terminal of the bias module 106 in the first sub-phase T111 is smaller than the voltage input to the input terminal of the bias module 106 in the second sub-phase T112.

In FIG. 16, the first phase T11 includes the first sub-phase T111 and second sub-stage T112 located in the first phase T11 and close to the second phase T12. The bias voltage of the first sub-phase T111 is smaller than the bias voltage of the second sub-phase T112. Optionally, the bias voltage of the second sub-phase T112 may be equal to the bias voltage of the display stage T2. The voltage input to the input terminal of the bias module 106 in the first sub-phase T111 is smaller than the voltage input to the input terminal of the bias module 106 in the second sub-phase T112. In an early period of the power-on stage T1, that is, the first sub-phase T111, all transistors in the display panel are not yet in the optimal on state. If the bias voltage DVH transmitted at this time is too large, some transistors in the display panel may be short-circuited. Therefore, the bias voltage input in the first sub-phase T111 is smaller than the bias voltage input in the second sub-phase T112. It may prevent some transistors in the display panel from short-circuiting. On the other hand, it is necessary to ensure that no current flows to the anode of the light-emitting element 20 at the power-on stage T1. Otherwise the light-emitting element 20 may emit light. Thus, the bias voltage DVH is set at a low voltage before the start time of the first power supply voltage VPvdd, which eliminates static charges at the second node N2 and third node N3.

Referring to FIGS. 4-11, the number of frames of the power-on phase T1 is greater than or equal to 5 and less than or equal to 15. The number of frames of the power-on stage T1 may not be too large or too small. If the number of frames of the power-on stage T1 is too small, it may not perform satisfactory electrostatic discharge at the three terminals of the drive module 101 (i.e., the first node N1, second node N2, and third node N3). If there are too many frames of the power-on stage T1, the time taken by the power-on stage T1 may be too long, which affects displaying images. In some cases, the number of frames of the power-on stage is between 5 and 15. The three terminals of the drive module 101 may be discharged and the time needed is not too long.

Referring to FIGS. 4-11, in the second phase T12, the start time when the peripheral drive circuit 30 provides the reset signal VREF to the first terminal of the first reset module 102 is before the start time of the first power supply voltage VPvdd.

Optionally, if the start time of the reset signal VREF is after the start time of the first power supply voltage VPvdd, the first power supply voltage VPvdd may be written into the first terminal of the drive module 101. When the reset signal VREF is written into the control terminal of the drive module 101, it causes a voltage difference between the control terminal and input terminal of the drive module 101. In the second phase T12, the start time when the peripheral drive circuit 30 provides the reset signal VREF to the first terminal of the first reset module 102 is before the start time of the first power supply voltage VPvdd. It may prevent the first power supply voltage VPvdd from being written into the first terminal of the drive module 101 before resetting the drive module 101, and avoid creating a voltage difference between the first terminal and control terminal of the drive module 101. The voltage difference may cause a screen brighter.

Optional, the start time of the reset signal VREF is in the first phase T11. It may ensure that the start time of the reset signal VREF is before the start time of the first power supply voltage VPvdd.

Figure 12:
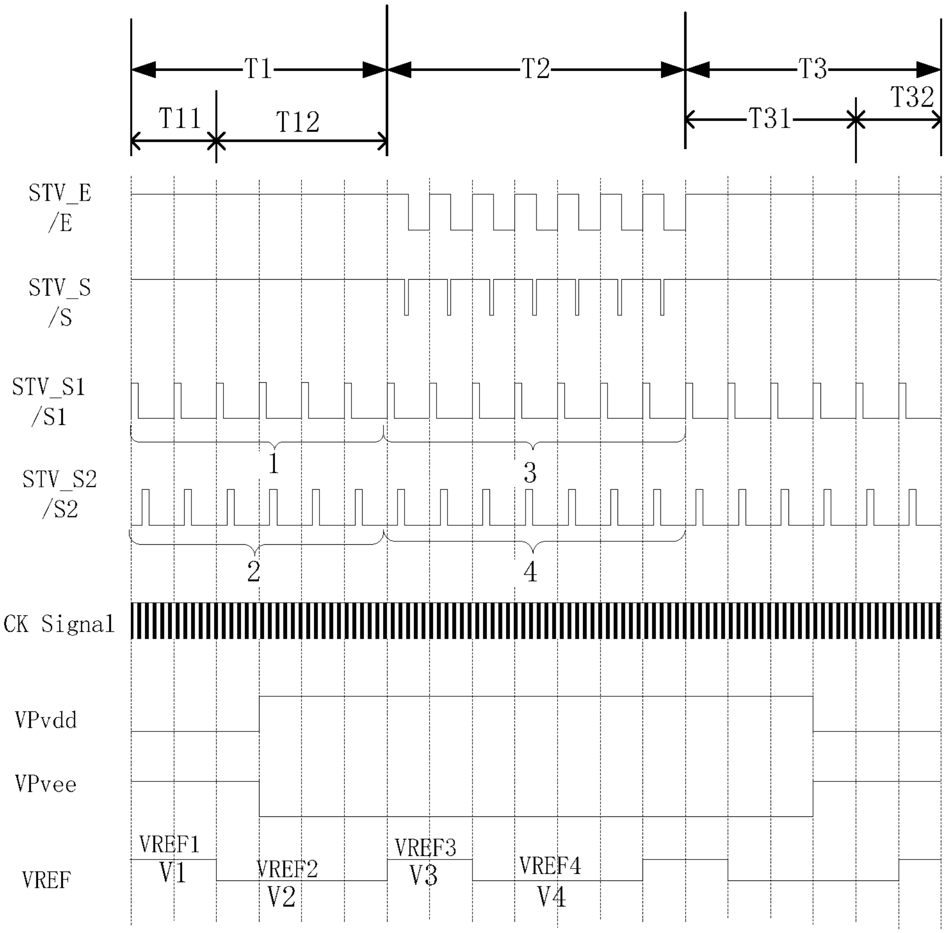
FIG. 12 shows another work timing diagram of a pixel circuit in FIG. 2 according to various disclosed embodiments of the present disclosure.

FIG. 12 illustrates another work timing diagram of the pixel circuit in FIG. 2 according to the present disclosure. At the power-on stage T1, the reset signal VREF includes a first sub-reset signal and a second sub-reset signal. In the first phase, the voltage of the first sub-reset signal VREF1 is V1. In the second phase T12, the voltage of the second sub-reset signal VREF2 is V2. V1 is smaller than V2. At the display stage T2, the reset signal includes a third sub-reset signal VREF3 and a fourth sub-reset signal VREF4. The voltage of the third sub-reset signal VREF3 is V3. The voltage of the fourth sub-reset signal is V4. V1 is equal to V3 within a preset range. V2 is equal to V4 within a preset range.

As shown in FIG. 12, the voltage V1 of the first sub-reset signal VREF1 in the first phase T11 is smaller than the voltage V2 of the second sub-reset signal VREF2 in the second phase T12. The voltage V3 of the third sub-reset signal VREF3 is smaller than the voltage V4 of the fourth sub-reset signal VREF4.

At the power-on stage, the voltage V1 of the first sub-reset signal VREF1 in the first phase T11 is smaller than the voltage V2 of the second sub-reset signal VREF2 in the second phase T12. It may reduce power consumption. Similarly, the third sub-reset signal VREF3 is smaller than the fourth sub-reset signal VREF4, which may also reduce power consumption. As it is arranged that V1=V3 and V2=V4, the first sub-reset signal VREF1, the second sub-reset signal VREF2, the third sub-reset signal VREF3, and the fourth sub-reset signal VREF4 form a alternation pattern. It may facilitate the drive chip IC providing reset signals periodically and dynamically.

FIG. 13 illustrates another schematic diagram of a circuit connection structure of a sub-pixel in FIG. 1 according to the present disclosure. The pixel circuit 10 further includes the data write module 104 and a light-emission control module 105. The light-emitting control module 105 is used to control the light-emitting element 20 to emit light. The first terminal of the light-emitting element 20 is electrically connected to an output terminal of the light-emitting control module 105. The second terminal of the light-emitting element 20 is electrically connected to the second power supply voltage signal terminal PVEE. The data write module 104 is used to write data signals into the drive module 101.

At the power-on stage T1, the light-emitting control module 105 and data write module 104 are turned off. At the display stage, the peripheral drive circuit 30 provides the third control signal E to a control terminal of the light-emitting control module 105 row by row. The third control signal E is a non-effective voltage. The peripheral drive circuit 30 provides the fourth control signal S to the control terminal of the data write module 104. The fourth control signal S is a non-effective voltage. The data write module 104 and light-emitting control module 105 are turned off.

Optionally, the first terminal of the data write module 104 is electrically connected to the data signal DATA. The second terminal of the data write module 104 is electrically connected to the first terminal of the drive module 101. The data write module 104 is used to provide the data signal DATA to the drive module 101. Optionally, the data write module 104 includes a third transistor M3. The gate of the third transistor M3 is connected to the fourth control signal S. The source of the third transistor M3 is connected to the data signal DATA. The drain of the third transistor M3 is electrically connected to the first terminal of the drive module 101 (the source of the drive transistor M0 is the second node N2). The pixel circuit 10 includes a data write phase at the display stage T2. The peripheral drive circuit provides the fourth control signal S to the control terminal of the data write module 104. The fourth control signal S is an effective voltage. The data write module 104 is turned on. The data signal DATA on the data line may be transmitted to the drive module 101.

Optionally, the light-emitting control module 105 includes a first light-emitting control module 1051 and a second light-emitting control module 1052. A first terminal of the first light-emitting control module 1051 is electrically connected to the first power supply voltage signal terminal PVDD. A second terminal of the first light-emitting control module 1051 is electrically connected to the first terminal of the drive module 101. A first terminal of the second light-emitting control module 1052 is electrically connected to the second terminal of the drive module 101. A second terminal of the second light-emitting control module 1052 is electrically connected to the light-emitting element 20. Optionally, the first light-emitting control module 1051 includes a fourth transistor M4. The gate of the fourth transistor M4 is connected to a third control signal E. The source of the fourth transistor M4 is connected to the first power supply voltage signal terminal PVDD. The drain of the fourth transistor M4 is connected to the first terminal of the drive module 101.

The pixel circuit 10 includes the light-emitting phase at the display stage T2. The peripheral drive circuit 30 transmits the third control signal E to the control terminal of the light-emitting control module 105 row by row. The third control signal E is an effective voltage. The light-emitting control module 105 is turned on, i.e., the first and second light-emitting control modules 1051 and 1052 are turned on. A conductive circuit is formed between the first power supply voltage VPvdd and second power supply voltage VPvee. The light-emitting element 20 emits light. The first and second light-emitting control modules 1051 and 1052 cooperate to provide a drive current to the light-emitting element 20. The first light-emitting control module 1051 is turned on. A positive voltage signal provided by the first power supply voltage VPvdd is supplied to the first terminal of the drive module 101. The drive module 101 is turned on under the control of its gate voltage, and provides a voltage signal at the first terminal of the drive module 101 to the second terminal of the drive module 101. The second light-emitting control module 1052 is turned on, providing the voltage signal at the second terminal of the drive module 101 to the light-emitting element 20. As such, a drive current flows through the light-emitting element 20 to control the light-emitting element 20 to emit light.

When the compensation module 103 is turned on, threshold compensation may be performed at the drive module 101. When the first reset module 102 is turned on, the control terminal voltage of the drive module 101 is the reset signal VREF. The control terminal of the drive module 101 is reset. It may facilitate turning on the drive module 101 during threshold compensation.

At the power-on stage T1, the light-emitting control module 105 and data write module 104 are turned off. At the display stage T2, the third control signal E provided by the peripheral drive circuit 30 to the control terminal of the light-emitting control module 105 is an effective voltage. The fourth control signal S provided to the control terminal of the data write module 104 is an effective level. The light-emitting control module 105 and data write module 104 are turned on. Thus, there is no need to provide control signals for controlling the light-emitting control module 105 and data write module 104 to turn on at the power-on stage T1. It may reduce power consumption of the display panel 100.

Referring to FIG. 13, the pixel circuit 10 further includes the second reset module 107. The second reset module 107 is connected through a connection point between the output terminal of the light-emitting control module 105 and first terminal of the light-emitting element 20 and used to initialize the first terminal of the light-emitting element 20. At the power-on stage T1, the second reset module 107 is turned off. The display stage T2 includes a reset phase between data write phases. In the reset phase, the second reset module 107 is turned on.

Optionally, the pixel circuit 10 is a 7T1C circuit. At the display stage T2, when the second reset module 107 is turned on, the anode voltage of the light-emitting element 20 is a reset signal VREF2. The reset signal VREF2 initializes the anode of the light-emitting element 20. It may improve the residue of the data signal DATA of a previous frame, improve the afterimage issue, and improve the display effect of the display panel. Optionally, the second reset module 107 includes a sixth transistor M6. The gate of the sixth transistor M6 is connected to the reset signal VREF2. The source of the sixth transistor M6 is electrically connected to the output terminal of the second light-emitting control module 1052. The drain of the sixth transistor M6 is electrically connected to the anode of the light-emitting element 20.

At the power-on stage T1, the second reset module 107 is turned off. In the reset phase of the display stage T2, the second reset module 107 is turned on. Thus, there is no need to provide a control signal to control the second reset module 107 to turn on at the power-on stage T1. It may reduce the power consumption at the power-on stage T1.

Referring to FIGS. 4-12, 15, and 16, the operation process of the display panel 100 further includes a power-off stage T3 after the display stage T2. The power-off stage T3 includes at least a third phase T31 and a fourth phase T32 in sequence.

In the third phase T31, the peripheral drive circuit 30 provides the first power supply voltage VPvdd to the first power supply voltage signal terminal PVDD and/or provides the second power supply voltage VPvee to the second power supply voltage signal terminal PVEE. In the fourth phase T32, the peripheral drive circuit 30 stops providing the first power supply voltage VPvdd to the first power supply voltage signal terminal PVDD and/or providing the second power supply voltage VPvee to the second power supply voltage signal terminal PVEE.

In both the third and fourth phases T31 and T32, the peripheral drive circuit 30 provides the first control signal S1 to the control terminal of the first reset module 102. The peripheral drive circuit 30 provides the second control signal S2 to the control terminal of the compensation module 103.

The power-off stage T3 is configured after the display stage T2 and includes the third phase T31 and fourth phase T32 in sequence. In the third phase T31 of the power-off stage T3, the first power supply voltage VPvdd and second power supply voltage VPvee are maintained for a certain period of time. In the fourth phase T32, the input of the first power supply voltage VPvdd and/or the second power supply voltage VPvee is stopped.

For at least part of certain frames throughout the power-off stage T3, the peripheral drive circuit 30 only provides the first control signal S1 to the control terminal of the first reset module 102 of the pixel circuit 10. At this time, the reset signal VREF is input to the control terminal of the drive module 101. The first node N1 is electrostatically discharged. The drive module 101 is turned on. The second control signal S2 is provided to the control terminal of the compensation module 103. The compensation module 103 is turned on. Electrostatic discharge is performed at the second node N2 and third node N3. Thus, the first node N1, second node N2, and third node N3 are electrostatically discharged at the power-off stage. At the next power-on stage T1, further electrostatic discharge is carried out. Therefore, the light-emitting element 20 does not flicker.

Figure 17:
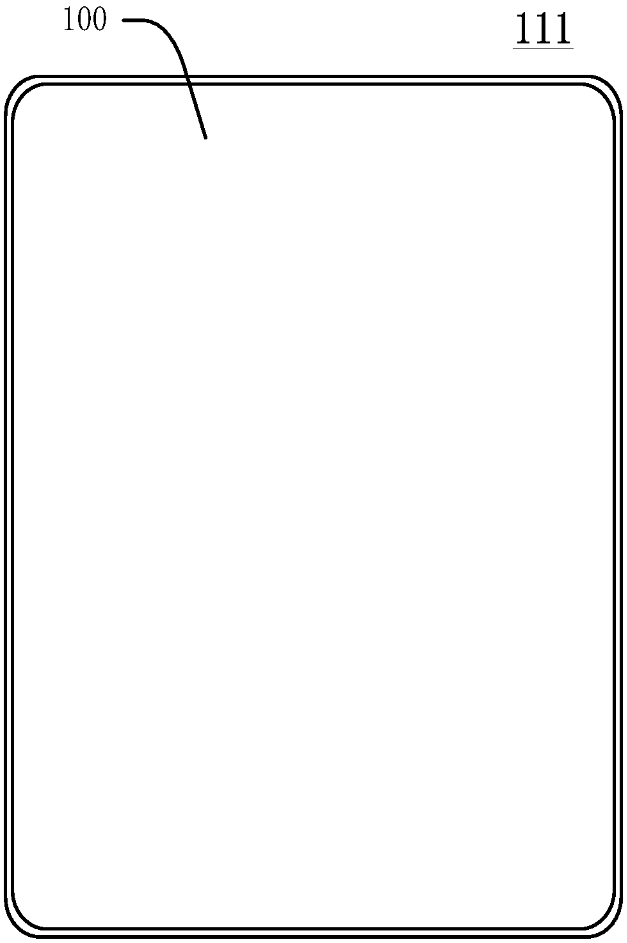
FIG. 17 shows a schematic diagram of a planar structure of a display device according to various disclosed embodiments of the present disclosure.

FIG. 17 illustrates a schematic diagram of a planar structure of a display device 111 according to the present disclosure. The display device 111 includes the display panel 100 illustrated above. As shown in FIG. 17, the display device 111 may be a mobile phone exemplarily. Alternatively, the display device 111 may also be a computer, a television, a car display device, or other display devices with display functions. The display device 111 has the beneficial effects of the display panel 100 provided by embodiments of the present disclosure.

The display panel and display device provided by the present disclosure at least achieve the following beneficial effects:

The display panel includes a pixel circuit and a light-emitting element that are electrically connected. The pixel circuit is used to control the light-emitting element to emit light. The pixel circuit at least includes a drive module, a first reset module, and a compensation module. The drive module and light-emitting element are connected in series between a first and a second power supply voltage signal terminal. The drive module is used to generate a drive current to drive the light-emitting element to emit light. The first reset module is electrically connected to a control terminal of the drive module and used to initialize the control terminal of the drive module. The compensation module is connected in series between the control terminal of the drive module and an output terminal of the drive module to compensate the voltage of the control terminal of the drive module. The compensation module is used to detect and compensate for the deviation of the threshold voltage of the drive module, and provide a compensated threshold voltage deviation to the drive module to achieve threshold compensation for the drive module. The drive module and light-emitting element are connected in series between the first and second power supply voltage signal terminals. When the pixel circuit drives the light-emitting element electrically connected to it to emit light, through a conductive path via the first power supply voltage signal terminal, the drive module, the light-emitting element, and the second power supply voltage signal terminal, the drive module generates a drive current that drives the light-emitting element to emit light. The light-emitting effect of the light-emitting element is achieved. The peripheral drive circuit provides a circuit signal to the pixel circuit. Since the first terminal of the drive module used with last display images is connected to the first power supply voltage of the first power supply voltage signal terminal, positive charges accumulate at the first terminal of the drive module. These charges are stored at parasitic capacitors. When a first control signal controls the first reset module to turn on and a second control signal controls the compensation module to turn on, due to Vgs<Vth at the drive module, the drive module is turned on and simultaneously remaining charges are released until the drive module is turned off. Then in the early period of the display stage, as residual charges have been released at the power-on stage, the light-emitting element does not flicker.

The embodiments disclosed herein are exemplary only. Other applications, advantages, alternations, modifications, or equivalents to the disclosed embodiments are obvious to those skilled in the art and are intended to be encompassed within the scope of the present disclosure. The scope of the present disclosure is defined by the appended claims.

What is claimed is:

1. A display panel, comprising:

a light-emitting element;

a pixel circuit, wherein the pixel circuit at least includes a drive module, a first reset module, and a compensation module, the drive module and the light-emitting element are connected in series between a first power supply voltage signal terminal and a second power supply voltage signal terminal, the drive module is used to generate a drive current to drive the light-emitting element to emit light, the first reset module is electrically connected to a control terminal of the drive module and used to initialize the control terminal of the drive module, and the compensation module is connected in series between the control terminal of the drive module and a second terminal of the drive module to compensate a voltage of the control terminal of the drive module; and a peripheral drive circuit providing a drive signal to the pixel circuit, wherein an operation process of the display panel at least includes a power-on stage and a display stage in sequence, the power-on stage at least includes a first phase and a second phase in sequence, the power-on stage includes a plurality of frames that is consecutive, during a period of at least part of frames of the power-on stage, the peripheral drive circuit provides a first control signal to a control terminal of the first reset module and the first reset module is turned on, the peripheral drive circuit provides a second control signal to a control terminal of the compensation module and the compensation module is turned on, and in the second phase, the peripheral drive circuit provides a first power supply voltage to the first power supply voltage signal terminal and/or provides a second power supply voltage to the second power supply voltage signal terminal.

2. The display panel according to claim 1, wherein during the period of at least part of frames of the power-on stage, the first control signal maintains an effective voltage, and during the period of at least part of frames of the power-on stage, the second control signal maintains an effective voltage.

3. The display panel according to claim 2, wherein within n consecutive frames of the power-on stage, the first control signal of an i-th frame maintains an effective voltage, the second control signal maintains a non-effective voltage, both the first and second control signals of an i+1th frame maintain effective voltages, n is a positive integer greater than or equal to 2, i is a positive integer, and i is less than or equal to n−1.

4. The display panel according to claim 1, wherein at the power-on stage, the second control signal maintains an effective voltage, the first control signal is a pulse signal, and the peripheral drive circuit transmits a pulse signal to the control terminal of the first reset module row by row.

5. The display panel according to claim 4, wherein at the display stage, the peripheral drive circuit provides a first display control signal to the control terminal of the first reset module, and an effective pulse width of the first control signal at the power-on stage is equal to an effective pulse width of the first display control signal.

6. The display panel according to claim 1, wherein the first control signal is a first pulse signal, the second control signal is a second pulse signal, the peripheral drive circuit transmits the first pulse signal to the control terminal of the first reset module row by row, the peripheral drive circuit transmits the second pulse signal to the control terminal of the compensation module row by row, and an effective pulse of the first pulse signal at least partially overlaps with an effective pulse of the second pulse signal.

7. The display panel according to claim 6, wherein at the power-on stage, a time during which the effective pulse width of the first pulse signal overlaps with the effective pulse width of the second pulse signal is t1; at the display stage, the peripheral drive circuit provides a first display control signal to the control terminal of the first reset module, the peripheral drive circuit provides a second display control signal to the control terminal of the compensation module; and at the display stage, a time during which an effective pulse width of the second display control signal overlaps with a pulse width of the first display control signal is t2, and it is arranged that t1=t2.

8. The display panel according to claim 1, wherein the first control signal is a first pulse signal, the second control signal is a second pulse signal, the peripheral drive circuit transmits the first pulse signal to the control terminal of the first reset module row by row, the peripheral drive circuit transmits the second pulse signal to the control terminal of the compensation module row by row, and a start time of the effective pulse of the second pulse signal is located after an end time of the effective pulse of the first pulse signal.

9. The display panel according to claim 8, wherein at the display stage, the peripheral drive circuit provides a first display control signal to the control terminal of the first reset module, the peripheral drive circuit provides the second display control signal to the control terminal of the compensation module, a pulse width of the first pulse signal at the power-on stage is equal to a pulse width of the first display control signal at the display stage, and a pulse width of the second pulse signal at the power-on stage is equal to a pulse width of the second display control signal at the display stage.

10. The display panel according to claim 6, wherein the pixel circuit further includes a data write module and a bias module, the data write module is used to write a data signal into the drive module, an output terminal of the bias module is electrically connected to an output terminal of the data write module and an input terminal of the drive module, and at the power-on stage, the peripheral drive circuit transmits a fifth control signal to a control terminal of the bias module and the bias module is turned on.

11. The display panel according to claim 10, wherein the first phase includes a first sub-phase and a second sub-phase, the second sub-phase is located at a time within the first phase and close to the second phase, and a voltage input to an input terminal of the bias module in the first sub-phase is smaller than a voltage input to the input terminal of the bias module in the second sub-phase.

12. The display panel according to claim 1, wherein a number of frames of the power-on stage is greater than or equal to 5 and less than or equal to 15.

13. The display panel according to claim 1, wherein in the second phase, a start time when the peripheral drive circuit provides a reset signal to a first terminal of the first reset module is before a start time of the first power supply voltage.

14. The display panel according to claim 13, wherein at the power-on stage, the reset signal includes a first sub-reset signal and a second sub-reset signal, a voltage of the first sub-reset signal is V1 in the first phase, and a voltage of the second sub-reset signal is V2 that is larger than V1; and at the display stage, the reset signal includes a third sub-reset signal and a fourth sub-reset signal, a voltage of the third sub-reset signal is V3, a voltage of the fourth sub-reset signal is V4, and it is arranged that V1 is equal to V3 within a preset range and V2 is equal to V4 within another preset range.

15. The display panel according to claim 1, wherein the pixel circuit further includes a data write module and a light-emitting control module, the light-emitting control module is used to control the light-emitting element to emit light, a first terminal of the light-emitting element is electrically connected to an output terminal of the light-emitting control module, the second terminal of the light-emitting element is electrically connected to the second power supply voltage signal terminal, the data write module is used to write a data signal into the drive module; at the power-on stage, the light-emitting control module and the data write module are turned off, a third control signal is transmitted to a control terminal of the light-emitting control module by the peripheral drive circuit row by row, the third control signal is a non-effective voltage, the peripheral drive circuit provides a fourth control signal to a control terminal of the data write module, and the fourth control signal is a non-effective voltage; and the display stage includes a data write phase and a light-emitting phase, the peripheral drive circuit provides the fourth control signal to the control terminal of the data write module in the data write phase, the fourth control signal is an effective voltage, the peripheral drive circuit row by row transmits the third control signal stage by stage to the control terminal of the light-emitting control module, and the third control signal is an effective voltage.

16. The display panel according to claim 15, wherein the pixel circuit further includes a second reset module connected through a connection point between the output terminal of the light-emitting control module and the first terminal of the light-emitting element and used to initialize the first terminal of the light-emitting element, the second reset module is turned off at the power-on stage, the display stage includes a reset phase before the data write phase, and the second reset module is turned on in the reset phase.

17. The display panel according to claim 1, wherein the operation process of the display panel further includes a power-off stage after the display stage, the power-off stage at least includes a third phase and a fourth phase in sequence, the peripheral drive circuit provides the first power supply voltage to the first power supply voltage signal terminal and/or provides the second power supply voltage to the second power supply voltage signal terminal in the third phase, the peripheral drive circuit stops providing the first power supply voltage to the first power supply voltage signal terminal and/or providing the second power supply voltage to the second power supply voltage signal terminal in the fourth phase, the peripheral drive circuit provides the first control signal to the control terminal of the first reset module in the third phase and the fourth phase, and the peripheral drive circuit provides the second control signal to the control terminal of the compensation module.

18. A display device, comprising:

a display panel, wherein the display panel includes:

a light-emitting element;

a pixel circuit, wherein the pixel circuit at least includes a drive module, a first reset module, and a compensation module, the drive module and the light-emitting element are connected in series between a first power supply voltage signal terminal and a second power supply voltage signal terminal, the drive module is used to generate a drive current to drive the light-emitting element to emit light, the first reset module is electrically connected to a control terminal of the drive module and used to initialize the control terminal of the drive module, and the compensation module is connected in series between the control terminal of the drive module and a second terminal of the drive module to compensate a voltage of the control terminal of the drive module; and a peripheral drive circuit providing a drive signal to the pixel circuit, wherein an operation process of the display panel at least includes a power-on stage and a display stage in sequence, the power-on stage at least includes a first phase and a second phase in sequence, the power-on stage includes a plurality of frames that is consecutive, during a period of at least part of frames of the power-on stage, the peripheral drive circuit provides a first control signal to a control terminal of the first reset module and the first reset module is turned on, the peripheral drive circuit provides a second control signal to a control terminal of the compensation module and the compensation module is turned on, and in the second phase, the peripheral drive circuit provides a first power supply voltage to the first power supply voltage signal terminal and/or provides a second power supply voltage to the second power supply voltage signal terminal.

19. The display panel according to claim 18, wherein the first control signal is a first pulse signal, the second control signal is a second pulse signal, the peripheral drive circuit transmits the first pulse signal to the control terminal of the first reset module row by row, the peripheral drive circuit transmits the second pulse signal to the control terminal of the compensation module row by row, and an effective pulse of the first pulse signal at least partially overlaps with an effective pulse of the second pulse signal.

20. The display panel according to claim 18, wherein in the second phase, a start time when the peripheral drive circuit provides a reset signal to a first terminal of the first reset module is before a start time of the first power supply voltage.

* * * * *